(12) United States Patent
Safai

(10) Patent No.: US 9,025,045 B2
(45) Date of Patent: May 5, 2015

(54) DIGITAL IMAGE PROCESSOR FOR A DIGITAL CAMERA

(71) Applicant: Avago Technologies General IP (Singapore) Pte. Ltd., Singapore (SG)

(72) Inventor: Mohammad A. Safai, Los Altos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/899,274

(22) Filed: May 21, 2013

(65) Prior Publication Data

US 2013/0250138 A1    Sep. 26, 2013

Related U.S. Application Data

(63) Continuation of application No. 12/851,028, filed on Aug. 5, 2010, now Pat. No. 8,466,978, which is a continuation of application No. 11/932,478, filed on Oct. 31, 2007, now Pat. No. 7,903,149, which is a continuation of application No. 10/603,395, filed on Jun. 24, 2003, now Pat. No. 7,321,388, which is a continuation of application No. 09/087,253, filed on May 29, 1998, now Pat. No. 6,642,956.

(51) Int. Cl.
| | |
|---|---|
| *H04N 5/228* | (2006.01) |
| *H04N 5/77* | (2006.01) |
| *H04N 5/232* | (2006.01) |
| *H04N 5/335* | (2011.01) |
| *H04N 5/365* | (2011.01) |
| *H04N 5/369* | (2011.01) |
| *H04N 5/376* | (2011.01) |
| *H04N 9/73* | (2006.01) |
| *H04N 9/04* | (2006.01) |
| *H04N 5/765* | (2006.01) |
| *H04N 5/775* | (2006.01) |
| *H04N 5/907* | (2006.01) |
| *H04N 9/804* | (2006.01) |

(52) U.S. Cl.
CPC ............. *H04N 5/772* (2013.01); *H04N 5/232* (2013.01); *H04N 5/23225* (2013.01); *H04N 5/335* (2013.01); *H04N 5/365* (2013.01); *H04N 5/369* (2013.01); *H04N 5/3765* (2013.01); *H04N 5/765* (2013.01); *H04N 5/775* (2013.01); *H04N 5/907* (2013.01); *H04N 9/045* (2013.01); *H04N 9/8047* (2013.01); *H04N 2209/046* (2013.01); *H04N 9/735* (2013.01)

(58) Field of Classification Search
USPC ......................................... 348/207.99, 222.1
See application file for complete search history.

(56) References Cited

U.S. PATENT DOCUMENTS

| | | |
|---|---|---|
| 3,744,390 A | 7/1973 | Clark |
| 3,820,133 A | 6/1974 | Adorney et al. |

(Continued)

*Primary Examiner* — Ngoc-Yen Vu

(57) ABSTRACT

A digital camera and methods of operating a digital camera are disclosed. In one aspect of the invention, a digital camera includes an imaging unit including an image sensor and imaging optics and a digital image processor connected to receive raw digital images from the imaging unit and to process the raw digital images. The digital camera also includes a memory configured to store digital image data that has been pre-processed by the digital image processor and a processor configured to direct retrieval of the digital image data that is stored in the memory and the digital image processor comprises a pre-processing portion and a post-processing portion, the pre-processing portion including a uniformity corrector configured to correct non-uniformities using Photo Response Non-Uniformity (PRNU) correction and/or white balancing.

20 Claims, 15 Drawing Sheets

(56) References Cited

U.S. PATENT DOCUMENTS

| | | | |
|---|---|---|---|
| 3,852,602 A | 12/1974 | Gramm et al. | |
| 3,864,708 A | 2/1975 | Allen | |
| 3,974,329 A | 8/1976 | Zenzefilis | |
| 4,005,261 A | 1/1977 | Sato et al. | |
| 4,013,876 A | 3/1977 | Anstin | |
| 4,092,654 A | 5/1978 | Alasia | |
| 4,097,893 A | 6/1978 | Camras | |
| 4,423,934 A | 1/1984 | Lambeth et al. | |
| 4,544,960 A | 10/1985 | Konishi | |
| 4,546,380 A | 10/1985 | Knop | |
| 4,587,633 A | 5/1986 | Wang et al. | |
| 4,591,900 A | 5/1986 | Heeb et al. | |
| 4,713,686 A | 12/1987 | Ozaki et al. | |
| 4,811,043 A | 3/1989 | Ishimura et al. | |
| 4,819,059 A | 4/1989 | Pape | |
| 4,819,077 A | 4/1989 | Kikuchi et al. | |
| 4,833,533 A | 5/1989 | Augusti et al. | |
| 4,985,911 A | 1/1991 | Emmons et al. | |
| 5,003,399 A | 3/1991 | Ishimaru et al. | |
| 5,021,811 A | 6/1991 | Maurinus et al. | |
| 5,027,214 A | 6/1991 | Fujimori | |
| 5,047,861 A | 9/1991 | Houchin et al. | |
| 5,062,136 A | 10/1991 | Gattis et al. | |
| 5,153,730 A | 10/1992 | Nagasaki et al. | |
| 5,164,831 A * | 11/1992 | Kuchta et al. | 348/231.7 |
| 5,164,982 A | 11/1992 | Davis | |
| 5,185,671 A | 2/1993 | Lieberman et al. | |
| 5,202,767 A | 4/1993 | Dozier et al. | |
| 5,264,935 A | 11/1993 | Nakajima | |
| 5,264,944 A | 11/1993 | Takemura | |
| 5,282,025 A | 1/1994 | Sato | |
| 5,396,290 A | 3/1995 | Kannegundla et al. | |
| 5,402,170 A | 3/1995 | Parulski et al. | |
| 5,418,565 A | 5/1995 | Smith | |
| 5,438,359 A | 8/1995 | Aoki | |
| 5,440,699 A | 8/1995 | Farrand et al. | |
| 5,466,560 A | 11/1995 | Sowinski et al. | |
| 5,471,383 A | 11/1995 | Gobush et al. | |
| 5,477,264 A | 12/1995 | Sarbadhikari et al. | |
| 5,485,370 A | 1/1996 | Moss et al. | |
| 5,493,332 A | 2/1996 | Dalton et al. | |
| 5,499,294 A | 3/1996 | Friedman | |
| 5,500,700 A | 3/1996 | Massarsky | |
| 5,517,136 A | 5/1996 | Harris | |
| 5,517,265 A | 5/1996 | Zander et al. | |
| 5,525,957 A | 6/1996 | Tanaka | |
| 5,526,046 A | 6/1996 | Kindo | |
| 5,528,293 A | 6/1996 | Watanabe | |
| 5,534,921 A | 7/1996 | Sawanobori | |
| 5,541,653 A | 7/1996 | Peters et al. | |
| 5,541,656 A | 7/1996 | Kare et al. | |
| 5,546,194 A | 8/1996 | Ross | |
| 5,555,464 A | 9/1996 | Hatlestad | |
| 5,576,757 A | 11/1996 | Roberts et al. | |
| 5,576,758 A | 11/1996 | Arai | |
| 5,581,299 A | 12/1996 | Raney | |
| 5,587,928 A | 12/1996 | Jones et al. | |
| 5,606,365 A | 2/1997 | Maurinus et al. | |
| 5,659,323 A | 8/1997 | Taylor | |
| 5,666,159 A * | 9/1997 | Parulski et al. | 348/211.2 |
| 5,682,441 A | 10/1997 | Ligtenberg et al. | |
| 5,696,560 A | 12/1997 | Songer | |
| 5,696,850 A | 12/1997 | Parulski et al. | |
| 5,706,457 A | 1/1998 | Dwyer et al. | |
| 5,708,856 A | 1/1998 | Cloutier | |
| 5,710,834 A | 1/1998 | Rhoads | |
| 5,719,987 A | 2/1998 | Kawamura et al. | |
| 5,790,193 A | 8/1998 | Ohmori | |
| 5,818,973 A * | 10/1998 | Hsu | 382/260 |
| 5,844,612 A * | 12/1998 | Israelsen | 375/240.14 |
| 5,887,085 A | 3/1999 | Otsuka | |
| RE36,338 E | 10/1999 | Fukuoka | |
| 6,091,452 A | 7/2000 | Nishiyama | |
| 6,091,851 A * | 7/2000 | Acharya | 382/167 |
| 6,151,069 A | 11/2000 | Dunton et al. | |
| 6,154,493 A | 11/2000 | Acharya et al. | |
| 6,163,341 A | 12/2000 | Kawaguchi et al. | |
| 6,163,342 A * | 12/2000 | Suzuki | 348/364 |
| 6,195,125 B1 | 2/2001 | Udagawa | |
| 6,222,538 B1 | 4/2001 | Anderson | |
| 6,222,985 B1 * | 4/2001 | Miyake | 386/224 |
| 6,226,034 B1 | 5/2001 | Katayama | |
| 6,253,023 B1 | 6/2001 | Fukushima et al. | |
| 6,292,272 B1 | 9/2001 | Okauchi et al. | |
| 6,297,851 B1 * | 10/2001 | Taubman et al. | 348/572 |
| 6,388,706 B1 | 5/2002 | Takizawa et al. | |
| 6,392,699 B1 | 5/2002 | Acharya | |
| 6,512,548 B1 * | 1/2003 | Anderson | 348/333.05 |
| 6,522,830 B2 * | 2/2003 | Yamagami | 386/240 |
| 6,535,243 B1 | 3/2003 | Tullis | |
| 6,542,192 B2 | 4/2003 | Akiyama et al. | |
| 6,594,036 B1 * | 7/2003 | Wong et al. | 358/471 |
| 6,628,336 B2 | 9/2003 | Hamamura | |
| 6,642,956 B1 | 11/2003 | Safai | |
| 7,015,962 B2 | 3/2006 | Acharya | |
| 7,508,444 B1 | 3/2009 | Napoli et al. | |
| 2004/0004664 A1 | 1/2004 | Safai | |

\* cited by examiner

DIGITAL IMAGE PROCESSOR FOR A DIGITAL CAMERA

CROSS-REFERENCE TO RELATED APPLICATIONS

This is a continuation of co-pending U.S. patent application Ser. No. 12/851,028, filed Aug. 5, 2010, of Mohammad A. Safai for DIGITAL IMAGE PROCESSOR FOR A DIGITAL CAMERA, which is a continuation of U.S. patent application Ser. No. 11/932,478, filed Oct. 31, 2007, of Mohammad A. Safai for DIGITAL IMAGE PROCESSOR FOR A DIGITAL CAMERA (now U.S. Pat. No. 7,903,149), which is a continuation of U.S. patent application Ser. No. 10/603,395, filed Jun. 24, 2003, of Mohammad A. Safai for DIGITAL IMAGE PROCESSOR FOR A DIGITAL CAMERA (now U.S. Pat. No. 7,321,388), which is a continuation of U.S. patent application Ser. No. 09/087,253, filed May 29, 1998, of Mohammad A. Safai for DIGITAL IMAGE PROCESSOR FOR A DIGITAL CAMERA (now U.S. Pat. No. 6,642,956), all of which are hereby incorporated by reference for all that is disclosed therein.

BACKGROUND OF THE INVENTION

1. Field of the Invention

The present invention generally relates to digital cameras. More particularly, improved digital camera architectures and components are described.

2. Description of the Related Art

Recently, digital cameras have become very popular. The digital camera converts an optical image to electronic image data and digitally records the image data on a storage medium. When the image is reproduced, the recorded digital data is retrieved from the storage medium and displayed on a display device or printed out as a hard copy image.

Referring initially to Figure I, conventional digital camera systems 100 typically include a digital camera 102 having an optical lens 104 for focusing light rays onto an imaging capture unit 106. The imaging capture unit 106 typically relies upon an array of light sensitive photo optic cells 108, capable of converting the light rays received from the optical lens 104 into representative analog signals. Most commonly, the photo optic cells take the form of charge-coupled devices (CCDs), although other devices such as CMOS receptors may be used as well. As is well known in the art, each CCD array 108 must have associated with it a specific color filter array (CFA). In most applications, the CFA is an empirically derived pattern of individual color filters each associated with a specific CCD cell in the CCO array. A color converter circuit 110 then uses a particular interpolation algorithm associated with the specific CFA to generate the analog signals representing the CCD manufacturer's predetermined concept of the proper color scheme of the image. Manual input controls 103 (i.e., pushbuttons, for example) provide manual inputs to a step controller 105 suitably disposed to provide control signals to the imaging capture unit 106. Such control signals are used to control such imaging parameters as f-stop, exposure, zoom, focus, and flash attachments, if appropriate.

The imaging capture unit 106 sends the analog signals representing the image first to an analog-to-digital (A/D) converter unit 112. The A/D converter unit 112 converts the representative analog signals into digital signals representative of the image. The digital signals are then passed to a digital signal processor (DSP) 114 where they are converted to appropriate digital formats. An image compression circuit 116 as well as a memory 118 both receive the appropriately formatted digital signals. The image compression circuit 116 operates to digitally compress the received digital images in order to reduce the amount of resources required to further process the digital signals. One such formatting scheme referred to as JPEG is commonly used, although there are a wide variety of suitable picture formats. Once the image has been digitally compressed, it is sent by way of a memory interface 120 to a memory slot 122 capable of receiving a memory card 124 suitable for storing the compressed digital signals. Such memory cards 124 include "floppy" disks, flash EPROM cards, R/W compact disc (CD), SmartMedia and the like.

Unfortunately, conventional digital cameras have several important limitations. One such limitation is the fact that the conventional digital camera may only use the color filter array (CFA) and its associated color interpolation algorithms. Any subsequent improvements in CCD array technology cannot easily be incorporated into the conventional digital camera system.

Lack of integration also provides for expensive and cumbersome digital cameras. As can be readily seen, the conventional digital camera system 100 has many discrete functional blocks encompassing many different circuits. It is therefore relatively expensive for conventional digital cameras to provide image correction, color correction, image compression, as well as provide all appropriate control and timing signals in one unit.

In addition, each CCD or CMOS imager has different clocking requirements, resolution, etc. That requires dedicated ASICs, or other dedicated logic, to properly drive them. This results in higher manufacturing cost and an inflexible camera architecture.

It would be advantageous and therefore desirable to have available components that can be used by a variety of digital camera manufacturers, regardless of their specific image sensor, color interpolation scheme, etc.

SUMMARY OF THE INVENTION

A digital camera and methods of operating a digital camera are disclosed. In one aspect of the invention, a digital camera includes an imaging unit including an image sensor and imaging optics and a digital image processor connected to receive raw digital images from the imaging unit and to process the raw digital images. The digital camera also includes a memory configured to store digital image data that has been pre-processed by the digital image processor and a processor configured to direct retrieval of the digital image data that is stored in the memory and the digital image processor comprises a pre-processing portion and a post-processing portion, the pre-processing portion including a uniformity corrector configured to correct non-uniformities using Photo Response Non-Uniformity (PRNU) correction.

In another aspect of the invention, a method of operating a digital camera is disclosed. The method includes the following operations. First, raw image data is captured using an imaging unit that includes an image sensor and imaging optics. Next, the raw image data is pre-processed in a digital image processor connected to receive raw digital images from the imaging unit to correct non-uniformities in the raw image data, wherein the pre-processing comprises Photo Response Non-Uniformity (PRNU) correction.

In another aspect of the invention, a digital camera includes an imaging unit including an image sensor and imaging optics and a digital image processor connected to receive raw digital images from the imaging unit and to process the raw digital images. The digital camera also includes a memory configured to store digital image data that has been pre-processed by the digital image processor and a processor configured to direct retrieval of the digital image data that is stored in the memory and the digital image processor comprises a pre-processing portion and a post-processing portion, the pre-processing portion including a uniformity corrector configured to correct non-uniformities using white balancing.

In another aspect of the invention, a method of operating a digital camera is disclosed. The method includes the following operations. First, raw image data is captured using an imaging unit that includes an image sensor and imaging optics. Next, the raw image data is pre-processed in a digital image processor connected to receive raw digital images from the imaging unit to correct non-uniformities in the raw image data, wherein the pre-processing comprises white balancing.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention is illustrated by way of example, and not by way of limitation, in the figures of the accompanying drawings where like reference numerals refer to analogous or similar elements to facilitate ease of understanding and which.

DETAILED DESCRIPTION OF THE PREFERRED EMBODIMENTS

The present invention relates generally to digital cameras. In various aspects of the invention, the digital camera includes a programmable processor capable of processing digital images. The processing may include digital image correction and/or digital image authentication stamping, a programmable source of control and timing signals and the capability of providing an adaptive pixel color interpolator. In another aspect of the invention, the processor has a system bus architecture that provides the digital camera with enhanced flexibility.

In the following description, numerous specific details are set forth in order to provide a thorough understanding of the present invention. It will be apparent, however, to one skilled in the art, that the present invention may be practiced without some or all of these specific details. In other instances, well known structures or operations have not been described in detail in order to avoid unnecessarily obscuring the present invention.

Figure 1:
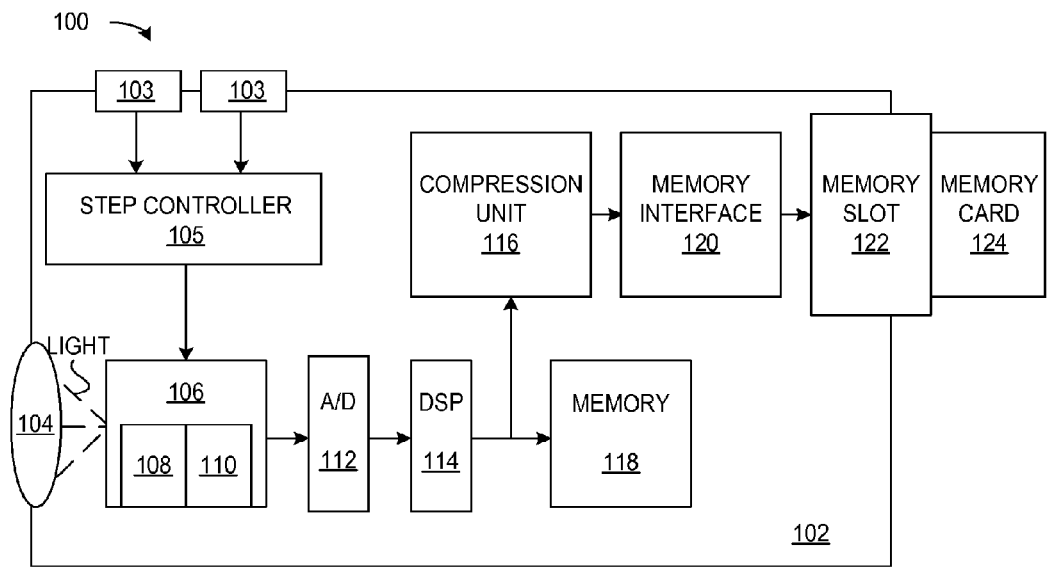
FIG. 1 is a block diagram of a conventional digital camera system.
Figure 2A:
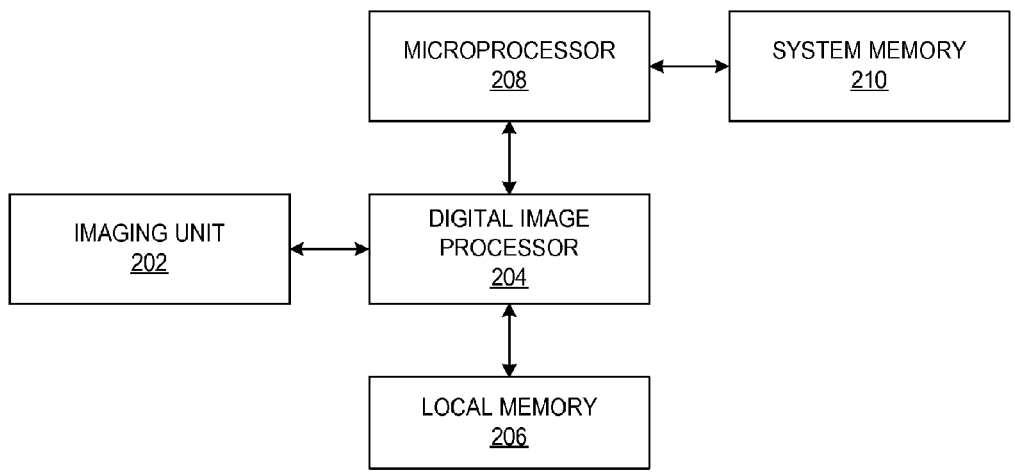
FIG. 2A is a block diagram of a digital camera system in accordance with one embodiment of the invention.

Referring initially to FIG. 2A, a digital camera system 200 in accordance with one embodiment of the invention will be described. The digital camera system 200 includes an imaging unit 202 connected to a digital image processor 204 capable of producing digital signals representative of a captured image. The digital image processor 204 is connected to a local memory 206 and is capable of performing digital image processing operations upon received digital images. Such processing operations include, but are not limited to, image correction, color correction, color interpolation, as well image compression and/or image file formatting. The local memory 206 is capable of fast storage and retrieval of selected digital image files.

In one embodiment, the digital image processor 204 is also capable of authentication stamping a particular digital image as well as deriving color weight factors useful in the operation of the imaging unit 202. A microprocessor 208 connected to the digital image processor 204 provides direction for the components including the digital camera system 200. A system memory 210 connected to the digital image processor 204 is capable of storing files that have passed through the image processor 204.

The digital images upon which the digital image processor 204 operates may be received from any appropriate source. Typically, raw digital images (i.e., those digital images that have not yet had any image processing) are provided by the imaging unit 202. Since the system memory 210 and the local memory 206 are each capable of storing digital images, they too can be a source of digital images for the digital image processor 204. In this way, the digital camera system 200 is capable of providing the user with digital images in any desired stage of processing.

The digital image processor 204 is also capable of generating a wide variety of control signals and/or timing signals. Such control signals and/or timing signals are useful in the operation of, for example, the imaging unit 202. By providing image processing as well as acting as a source of control signals and/or timing signals, the digital image processor 204 reduces the number of components required in the digital camera system 200 thereby, for example, commensurably reducing overall costs of manufacture of the digital camera system 200.

The digital camera system 200 also includes optics (not shown) such as, for example a lens, capable of directing light from any object to the imaging unit 202. The optics may include such optical systems as fiber optic transducers and fiber optic cables, refractive mirror assemblies, or any system or device capable of being optically coupled to the imaging unit 202.

Figure 2B:
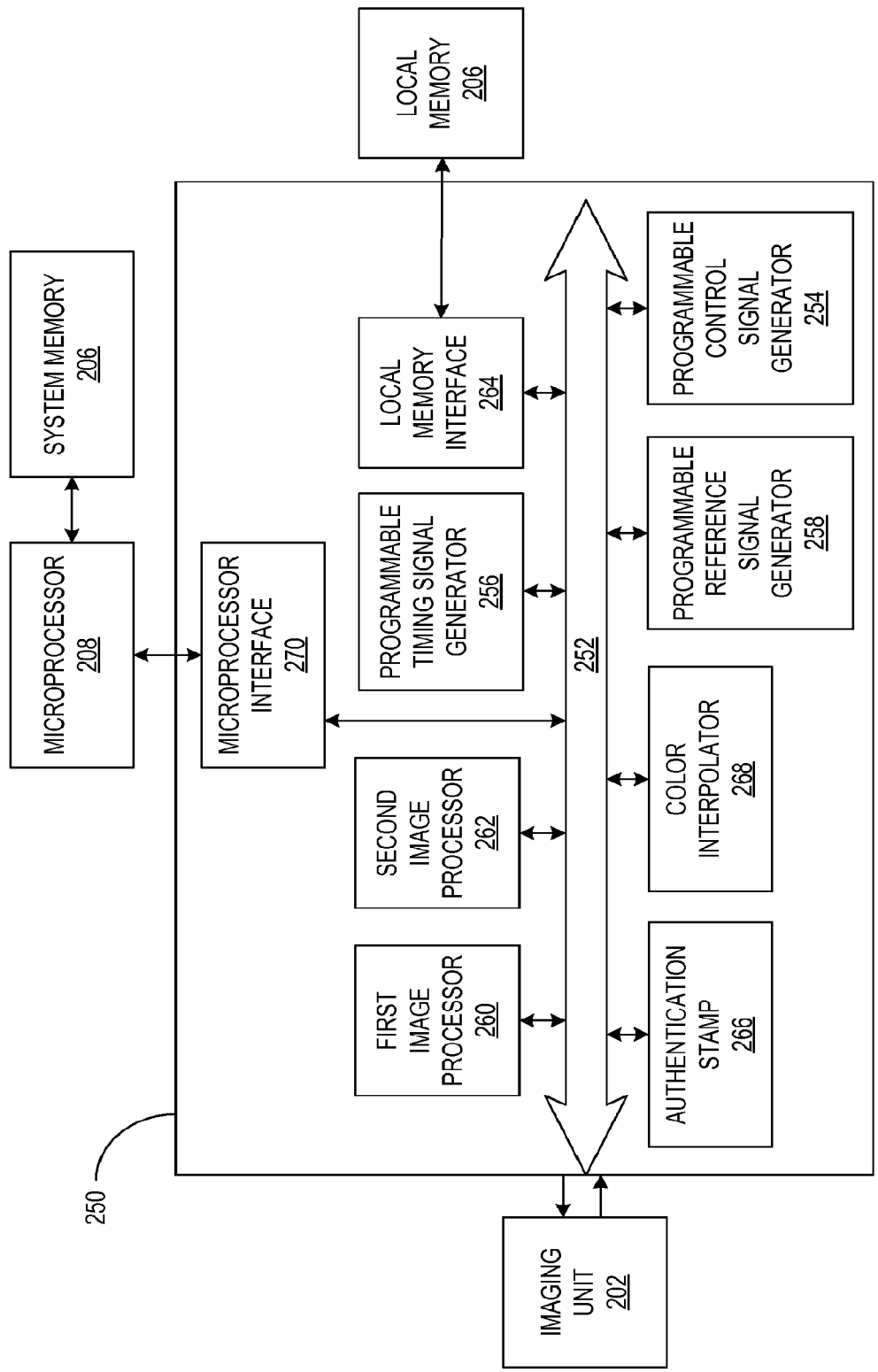
FIG. 2B is a block diagram of an implementation of the digital image processor shown in FIG. 2A.

FIG. 2B is a block diagram of a digital image processor 250 in accordance with an embodiment of the invention. It should be noted that the digital image processor 250 is but one possible embodiment of the digital image processor 204 used in the digital camera system 200 shown in FIG. 2A. Therefore, the digital image processor 250 shall be described in the context of the digital camera system 200 and all references included therein.

The digital image processor 250 includes a system bus 252 capable of carrying various signals. Such signals include but are not limited to data signals, control signals, and digital image signals. In the described embodiment, the system bus 252 receives raw digital images from the image capture unit 202. The system bus 252 also carries control signals generated by a programmable control signal generator 254. In one embodiment, the control signals so generated are supplied to the imaging unit 202, as needed, to control stepper motors included therein, for example. A programmable timing signal generator 256 provides timing signals as needed. Such timing signals are useful in the operation of, for example, image sensors included in the imaging unit 202. In addition, a programmable reference signal generator 258 provides reference signals. Such reference signals include those used in the operation of, for example, any analog components included in the digital camera 200.

The digital image processor 250 also includes first and second image processors 260, 262 connected to the system bus 252. The image processors are structured such that they may provide processing in addition to or independently of one another. It should be noted that in alternative embodiments, the digital image processors 260, 262 may include any number of digital image processors as may be desired or required for a particular application.

A local memory interface 264 connecting the system bus 252 to the local memory 206 provides the user of the digital camera system 200 with the capability of quickly storing a particular digital image or series of images. Such digital images include those processed by the first image processor 260 and/or the second image processor 262. In one implementation, such digital images include those raw digital images received from the imaging unit 202. Once stored in the local memory 206, the digital images are selectively available for any purpose, such as for example, further digital image processing by any component connected either directly or indirectly to the system bus 252.

In one embodiment of the invention, the digital image processor 250 includes an authentication stamper 266 used to generate an authenticity stamp. Typically, the authenticity stamp is useful in providing photographers and/or other end-users with the capability of determining the authenticity of any digital image so stamped. A color interpolator 268 is included to provide appropriate color interpolation when full color interpolation of a digital image by the digital image processor 250 is desired. Alternatively, when the color interpolation performed by the color interpolator 268 is performed by external mechanisms connected with the digital image processor 250 (such as the microprocessor 208), the color interpolator 268 may be bypassed. A microprocessor interface 270 provides an interface between the microprocessor 208 and the system bus 252.

Figure 3:
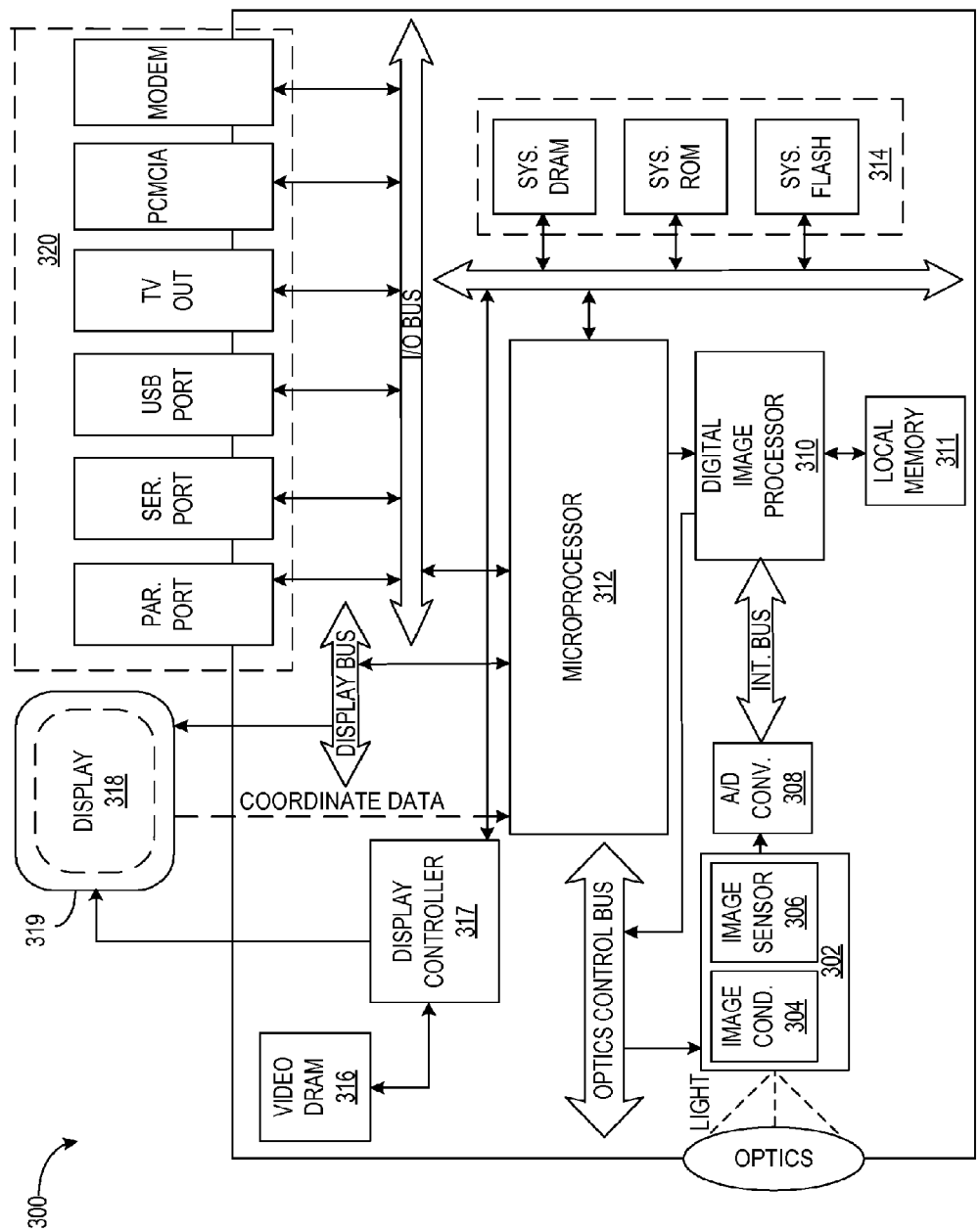
FIG. 3 is a block diagram of a digital camera system in accordance with another embodiment of the invention.

Referring next to FIG. 3, a digital camera system 300 in accordance with another embodiment of the invention will be described. It should be noted that the digital camera system 300 is but one possible embodiment of the digital camera system 200 shown in FIG. 2A. The digital camera system 300 includes an image capture unit 302, an A/D converter 308 that converts captured images to representative digital signals, and a configurable digital image process controller 310 arranged to perform some processing of the digital images and to provide various clocking and control signals to the image capture unit 302 and/or A/D converter 308. The digital camera system 300 further includes a local memory 311 for quickly storing digital images, a microprocessor 312, a system memory 314, a video DRAM 316 for storing video images, a video display controller 317, a display 318 having a touch screen 319, and an I/O block 320.

The image capture unit 302 includes an image conditioner 304 for conditioning the light received from the optical system before it is received at an image sensor 306. Such conditioning can include image focusing, image enlargement (referred to as zooming), image exposure, and any other suitable conditioning found useful in the formation of digital images. The image sensor 306 typically includes a grid, or array, of photo sites. The photosites can be any device capable of converting incident light (in the form of photons) into useable electrical signals. Typically, these photosites are formed of a semiconductor material and include charge-coupled devices (CCD) or complementary metal oxide semiconductor (CMOS) devices. Generally, each of the photo sites is associated with what is referred to in the art as a pixel (short for picture element). The resolution of the image sensor 306 is then determined by how many photosites are placed upon its surface. This resolution is specified in one of two ways: by its dimensions in pixels or by the total number of pixels in its images. For example, the same digital camera may claim to be 1200×800 pixels, or 960-thousand pixels.

Each of the photo sites in the image sensor 306 converts light into an associated electrical signal. Typically, the associated electrical signal so produced is related to the intensity (i.e., number of photons) of the light and not necessarily the color (i.e., frequency) of the light that falls upon the surface of the photo site. Therefore, in order to simulate the primary colors of red, blue, and green, for example, an associated color filter array (CFA) (also referred to as a color mask) must be placed in proximity to the photo site array. One such CFA is shown in Table 1 for a representative 4×4 CCD array.

TABLE 1

| |
|---|
| RGRG |
| GBGB |
| RGRG |
| GBGB |

The color filter array shown in Table 1 (known in the art as a "Beyer" pattern) illustrates one particular approach to forming a CFA where each photosite (and its associated pixel) has an associated single color filter. After exposure, the electrical signal generated by each photosite is converted to a digital signal taking the form of, for example, an 8-, 10-, or 12-bit binary number, otherwise referred to as a pixel color value. To create a 24-bit image, for example, interpolation is used whereby neighboring pixel color values are used to calculate the values for the other two primary colors for each pixel. By combining these two interpolated colors with the color measured by the photosite directly, the original color of every pixel is calculated.

During operation of the image sensor 306, each of the photosites included in the image sensor 306 generates an associated analog (electrical) signal representative of a portion of the image rendered by the image controller 306. The analog signals are then fed to an analog-to-digital A/D converter 308. The A/D converter 308 converts the received analog signals representative of the captured image into corresponding raw digital signals. An interface bus then carries corresponding raw digital signals to the digital image processor 310. At some point in the processing of a raw captured image, the image is typically color interpolated by the digital image processor. As will be described in more detail below; one feature of the digital image processor illustrated in FIG. 3 is that it includes a programmable color interpolator that may be programmed to implement a wide variety of different desired color interpolation schemes.

In the embodiment shown, the digital image processor 310 is connected to the microprocessor 312. It should be noted that a wide variety of microprocessors may be used and in some implementations, it may be desirable to combine the functionalities of the digital image processor 310 and microprocessor 312. One useful function provided by the microprocessor 312 referred to as data packetizing provides for efficient transmission and storage of the digital image data. In one implementation, the microprocessor 312 arranges the digital image data into discrete units such as data words formed of n data bits. In another implementation, the microprocessor 312 may packetize the digital image data into data packets having associated header portions and data portions.

The microprocessor 312 is capable of directing the retrieval of digital images stored in either the system memory 314 or the local memory 311. Once retrieved, the microprocessor 312 is capable of directing the sending of the digital images to any number and type of output devices that may be provided on the camera. In one implementation, the digital images may be sent by way of an I/O bus to the I/O block 320. In the described embodiment, the I/O block 320 includes I/O ports such as a parallel port, a serial port, a USB port, a TV signal output port, a PCMCIA port, as well as a modem port. The microprocessor 312 is also capable of directing the video controller 317 to store in the video DRAM 316 digital video images, which are then sent via a display bus to a display 318 for viewing. A touch screen 319 overlaying the display 318 is typically used to input display coordinate data to the microprocessor 312. Such coordinate display data is useful in coordinating user inputs resulting in improved ease of use of the digital camera 300. It should be noted that the microprocessor 312 is capable of parallel execution of these and any other instructions suitable for the operation of the digital image processor 310.

The digital image processor 310 also provides image sensor control signals to the image sensor 306 by way of an optics control bus. Such image sensor control signals include but are not limited to those suitable for synchronizing the array of photosites included in the image sensor 306. When the array of photo sites in the image sensor 306 is a CCD array, the CCD array requires clock signals that synchronize, for example, the reading of charge data in of each of the rows in the CCD array and its associated data register. These clock signals, otherwise referred to as pixel clock signals, may include other pixel clock signals used to synchronize the CCD array. In addition to providing a programmable source of image sensor control signals, the digital image processor 310 provides a programmable source of reference signals carried by the interface bus useful in the operation of, for example, the A/D converter 308.

Figure 4:
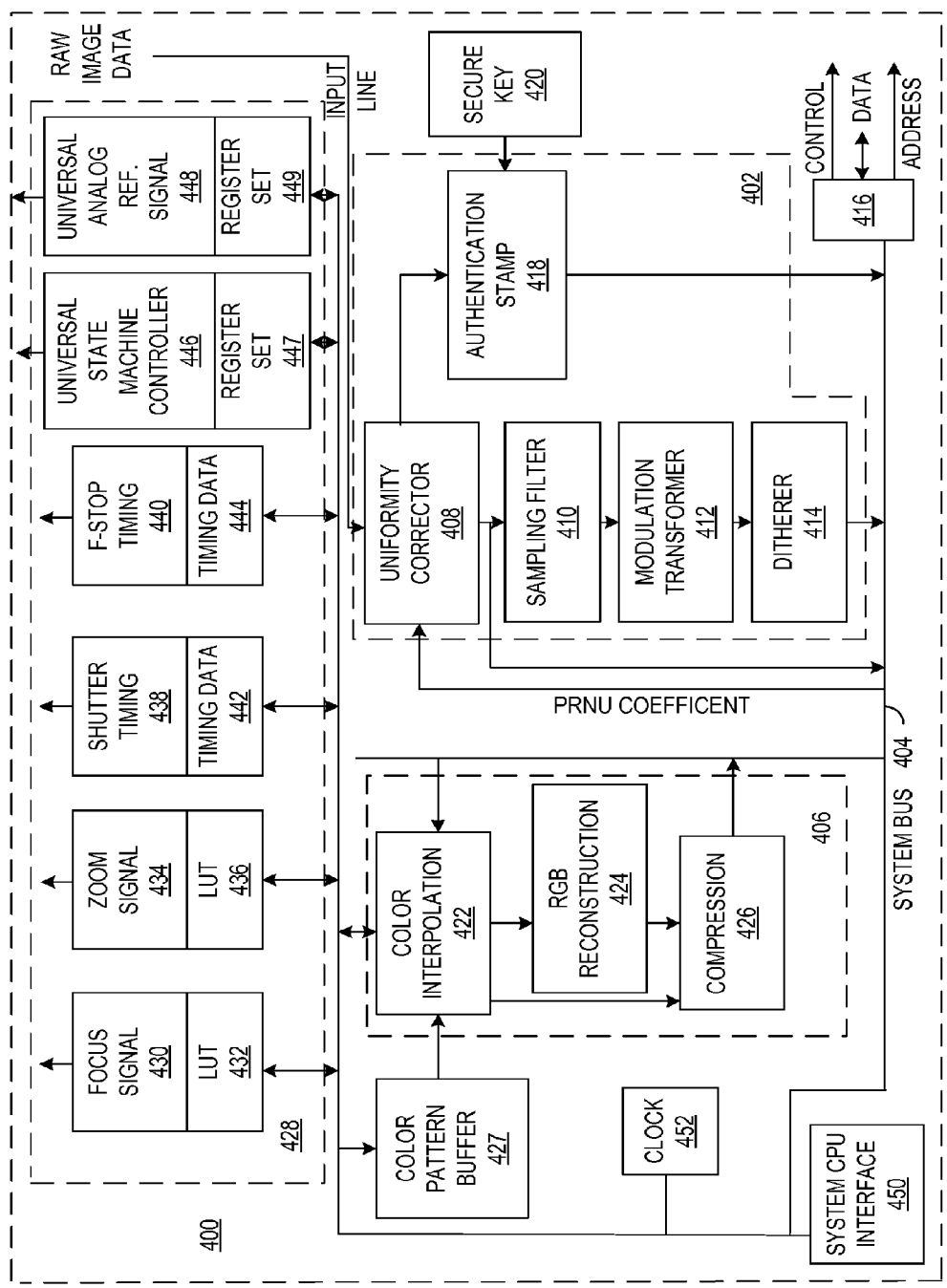
FIG. 4 is a block diagram of a digital image processor formed in accordance with an embodiment of the invention.

Referring next to FIG. 4, one embodiment of a digital image processor 310 will be described. It should be noted that the digital image processor 400 is but one possible implementation of the digital image processors 310 shown in FIG. 3. Typically, the integrated circuit in which the digital image processor 400 is formed is an application specific integrated circuit (ASIC) having various functional blocks and memory blocks included therein. However, in alternative embodiments it may be implemented in any suitable form including software and programmable logic and combinations of forms.

The configurable image controller 400 includes a preprocessor 402, a postprocessor 406, a local memory interface 416, a programmable universal controller 428 and a system CPU interface 450, all of which communicate over system bus 404. Raw image data that is received by the image controller 400 is first passed to the preprocessing stage 402, which typically does at least some preprocessing of the image data before the image data is stored in memory, displayed or otherwise handled.

In the illustrated embodiment, the preprocessing stage 402 includes a uniformity corrector 408, a sampling filter 410, a modulation transformer 412, and a ditherer 414. The uniformity corrector 408 performs digital image uniformity correction using, for example, Photo Response Non-Uniformity (PRNU) correction and white balancing. The uniformity corrector 408 is arranged to correct non-uniformities in the image sensor and typically uses a PRNU coefficient stored in the system memory 314 to correct any sensor based non-uniformities in the received digital image. In the described embodiment, the uniformity corrector 408 is placed first since it corrects sensor errors and it is expected that almost any digital camera incorporating the digital image processor will want to incorporate uniformity correction. In the (believed to be unlikely) event that no uniformity correction is desired, then the scaling coefficients can be set appropriately, or alternatively, the uniformity corrector 408 can be bypassed.

After the uniformity correction has been applied, the received image data may be handled in a variety of ways under the direction of the microprocessor depending upon the desires of a particular camera manufacturer. One operational mode that may be desired is referred to herein as a "capture mode", which rapidly stores digital images in the local memory 311. One appropriate capture mode may contemplate directly outputting images that have been processed by the uniformity corrector 408 to the local memory 311. This may be particularly useful when the camera it attempting to take a fast sequence of pictures. Alternatively, the stored digital image may be made available for immediate viewing on the display 318.

Another operational mode that may be desired is referred to herein as a "cineview" mode. As will be appreciated by those familiar with digital cameras, many digital cameras do not use traditional optical viewfinders. Rather, images from the image sensor are presented at a relatively fast rate on a small display on the camera. Typically the images are color images that are presented at rates on the order of approximately 16 frames per second. The sampling (decimation) filter 410 provided to permit quick image size reductions may facilitate faster and more efficient viewing on smaller displays such as those found in viewfinders. By way of example if a captured image has dimensions of 1200 by 800 pixels, but the on-camera display is only 300 by 200 pixels, the amount of pixel data that needs to efficiently be transferred to the on-camera display for viewing is the smaller amount of data.

Therefore, the sampling unit may be utilized to reduce the image file to the appropriate size, which speeds the processing of the image file and the delivery of the image data to the display. The sampling filter 410 receives input data from the uniformity corrector 408. The sampling filter 410 is programmable so that the amount of decimation may be either set by the manufacturer or programmed by the microprocessor. This permits the same sampling filter to be used with a wide variety of digital cameras, which may have very different image sensing pixel arrays and very different on-camera displays. The sampling filter may also be used to permit pictures having different image resolutions taken by a camera to be displayed on a single display.

While still in the cineview mode, the output of the sampling filter 410 is output to the modulation transformer 412. The modulation transformer 412 is connected to a ditherer 414 and is capable of correcting image degradation caused by the sampling filter 410. The modulation transformer 412 outputs the corrected digital image to the ditherer 414 which is arranged to perform anti-aliasing suitable to provide for better viewing on, for example, an LCD display. The ditherer 414 outputs the resulting image to the system bus 404 where it is available for display or even potentially, the local memory interface 416 for storing in the local memory 311. The pipelined architecture of the preprocessor permits the lower resolution images to be quickly processed, which is particularly desirable in the cineview mode so that the displayed images better simulate what a user might see through a conventional viewfinder.

The postprocessor 406 includes a number of processing blocks that implement specific transformations and other processing of an image that a camera manufacturer may desire to provide with the camera. In the embodiment shown, the postprocessor 406 includes a color interpolator 422, an RGB reconstruction block 424, a digital compressor 426 and a color pattern data buffer 427. The postprocessor is particularly useful in processing the digital images for printing or display.

The color interpolator 422 provides color correction to the captured image. Specifically, as described above with reference to Table 1, each pixel of the raw captured images typically indicates the intensity of the incoming light at one specific primary color as determined by the color filter array chosen by the manufacturer. The interpolator 422 is then used to estimate the values of the other two colors for each pixel. To do this, color correction factors suitable for estimating the values of the other colors for each pixel are determined. The actual values of the color correction factors chosen are typically based on a variety of factors including the color filter array used, the type of interpolation desired, and the designers sense of optimal color balance. In one aspect of the invention, the color interpolator 422 is capable of using color correction factors derived by, for example, firmware in the microprocessor 312, associated with a CFA included in the image sensor 306. This feature and the structure of one embodiment of the color interpolator 406 will be described in more detail below with reference to FIG. 5. By providing the capability of deriving color correction factors for any CFA, the configurable image process controller 310 may be used by any digital camera manufacturer, regardless of their specific image sensor, color interpolation scheme, etc., in a digital camera system. In this way, the configurable image process controller 310 will significantly reduce development time and costs, as well as component costs since specific ASICs are no longer necessary.

When not RGB based, the color corrected digital images are first output to an RGB reconstruction block 424 and then passed to a digital compressor 426. Otherwise, the color corrected digital images are sent directly to the digital compressor 426. Such digital compression techniques include those techniques based upon color space conversion, such as, for example, JPEG. Once digitally compressed, the compressed image files are then passed to the system bus 404 where, in one implementation, they may be stored in the system memory 314 and/or the local memory 311. A color pattern data buffer 427 connected to the system bus 404 capable of storing appropriate color interpolation input data is operatively connected to the color interpolator 422. Such color interpolation input data may include the number of pixels in the image sensor array, the particular CFA used with the image sensor array, as well as any particular image filtering and other appropriate digital image filtering values.

The described architectures provides camera manufactures with a great deal of flexibility in directing the data flow within the camera, as well as in defining the camera's functionalities and designs. For example, a raw digital image processed by the uniformity corrector 408 may be directly stored in the local memory 311 and later retrieved for further processing. Alternatively, the image may be passed through the sampling filter 410 and on through the preprocessor 402 prior to either storage in the local memory 311 or being passed for direct viewing on a viewfinder, for example. In this case, it may be desirable to provide a data buffer (not shown) to hold the image before the sampling filter 410.

Images that are stored in either memory may be retrieved and processed as desired. In some cases, the processing may be direct, while in other cases, the processing may be staged. For example, a PRNU and white balance processed image stored in memory may be retrieved and processed by the remainder of the preprocessor 402, including the sampling filter 410, the modulation transfer function block 412, as well as the dithering block 414. In other situations, a stored image may be retrieved and passed to the postprocessor 406, authentication stamper 418 or any of the other processing blocks that has direct or indirect access to the system bus.

In still another operational mode, the postprocessor 406 may receive digital image files directly from the preprocessor 402 by way of the system bus 404. It should be noted that the preprocessor 402 and the postprocessor 406 may concurrently process digital image files associated with different captured images.

In the described embodiment, the system memory 314 includes a system dynamic random access memory (DRAM), a system read only memory (ROM), random access memory (RAM), as well as any other appropriate volatile or nonvolatile storage media. Such storage media includes but is not limited to memory cards such as, for example, "floppy" disks, flash EPROM cards, R/W compact disc (CD), SmartMedia™ and the like.

It should be noted that due to the efficient architecture of the digital image processor 300, all operations are parallel in nature in that all may be performed substantially simultaneously.

As pointed out above, the primary purpose of the postprocessor 406 is to prepare the digital images for printing or display on an external device. In many circumstances, the camera's user may not have ready access to high quality printers suitable for printing photographs. Thus, it may be desirable for the user to send an electronic copy of a particular captured image to a commercial entity that prints the photograph. The postprocessor 406 can do the postprocessing necessary for such third party printing. However, it may be more efficiently and perfectly done by the third party which may have more sophisticated processing abilities, such as the use of a more sophisticated color interpolator. Thus, the described camera also supports another operational mode referred to herein as an off-line processing mode. In this mode, digital images stored in the local memory 311 or the system memory 314 can be output to any appropriate I/O port included in the I/O block 320. In this way, additional digital image processing available by external devices may be used to complete the digital image processing. Such digital image processing may include color correction, RGB reconstruction (if necessary), MTF, dithering, etc. In this way, the user is able to take advantage of digital image processing capabilities beyond those available using the digital camera 300. In addition, by digitally compressing the digital image(s) before being transmitted over, for example, the Internet, valuable time and resources are conserved.

Still referring to FIG. 4, the programmable universal controller 428 connected to the system bus 404 is capable of selectively generating control and reference signals. Such control signals include but are not limited to those used to in the operation of stepper motors, for example, included in the image conditioner 304. Other signals include periodic signals (such as clock signals, both symmetric and non-symmetric) used in the operation of the image sensor 306. When the image sensor 306 includes a CCD array, these periodic signals include clock signals referred to as pixel clock signals useful in the operation of the CCD array. It should be noted that due to the programmable nature of the programmable universal controller 428, a wide variety of image sensors can be accommodated by the digital image processor 310 without the need to resort to expensive and time consuming fitting procedures.

The programmable universal controller 428 is also capable of generating reference signals useful in the operation of analog components included in the digital camera 300. Such analog components for which the analog reference signals may be used include the A/D converter 308. By way of example, in one embodiment, the image capture unit 302 includes an automatic rangefinder useful in determining the distance to the object being photographed. Typically, the rangefinder generates signals related to the measured distance that are sent to an evaluator that determines whether or not the object is within the proper range. If not, microstepper controller signals are fed back to appropriate motors that control image conditioners, such as focus and zoom. More particularly, in one example, based upon the evaluation, a focus signal generator 430 and a zoom signal generator 434 generate appropriate micro-stepper control signals. These micro-stepper control signals are then fed to the image conditioner 304 by way of the optics control bus. In this way, the programmable universal controller 428 provides for rapid and automatic focus and zoom control without substantially increasing the number of components within the digital camera 300. Additionally, the digital image processor 310 is capable of reading the digital image from the image sensor 306 and analyzing a central portion of the array of photo sites for proper focus.

In one embodiment of the invention, a data buffer 432 associated with the focus signal generator 430 takes the form of a look up table (LUT) having stored micro-stepper signal values corresponding to the received distance signals. A data buffer 436 associated with the zoom signal generator 434 can also be a LUT having stored micro-stepper signal values associating the received distance signals to the proper zoom value. In addition to generating required micro-stepper controller signals, the programmable universal controller 428 supplies periodic signals, such as for example, timing signals.

Such timing signals may be generated in response to signals received from, for example, an f-stop controller, a light meter, a shutter controller as well as an associated flash controller included in, for example, the image conditioner 304.

By way of example, the image capture unit 302 may include a photometer responsive to the level of ambient light. The photometer may have an ambient light level threshold below which signals are sent to the programmable universal controller 428 indicating that the light level is insufficient to produce an image of the desired quality. At this point, a shutter timing generator 438 and an f-stop timing generator 440, for example, generate appropriate timing signals using a clock and associated timing data.

In one embodiment of the invention, the shutter timing generator 438 and the f-stop timing generator 440 are associated with a shutter timing data buffer 442 and an f-stop timing data buffer 444, respectively. The shutter timing data buffer 442 and the f-stop timing data buffer 444 are each capable of storing any data appropriate to the generation of the respective timing signals. A clock circuit 452 connected to the system bus 404 is used by the shutter timing generator 438 and the f-stop timing generator 444 to generate the required control signals. In this way, the digital image processor 400 provides an integrated automatic approach to the operation of the digital camera system 300.

In addition to providing timing and micro-stepper control signals, the programmable universal controller 428 includes a universal state machine controller 446 capable of providing both symmetric and non-symmetric periodic signals. Such periodic signals may include clock signals such as those pixel clock signals used to synchronize the operation of, for example, an exemplary CCD array included in the image sensor 306. Such pixel clock signals include integration clocks, reset clocks, shift clocks, and any other periodic signals deemed appropriate by, for example, an exemplary CCD array manufacturer.

The programmable universal controller 428 also includes a universal analog reference signal generator 448 capable of generating any required analog reference signals. These analog reference signals may be used in, for example, the operation of the A/D converter 308. Both the universal analog reference signal generator 448 and the universal state machine controller 446 have associated input data registers operatively connected to the system bus 404.

In one embodiment of the invention, the universal analog reference signal generator 448 and the universal state machine controller 446 each have a set of data registers 447 and 449, respectively, for storing data appropriate to the operational mode of the digital camera 300. By way of example, in what is referred to herein as the cineview mode, a stream of digital images are processed at a rate sufficient to simulate motion (typically in the range of approximately 10 fps to approximately 20 fps). In order to provide proper control and timing signals, data suitable for operating the digital camera 300 in cineview mode are stored in associated ones of the data registers 447 and the data registers 449.

The system CPU interface 450 connects the system bus 404 to the microprocessor 312 and provides access to all internal registers and data buffers included in the digital image processor 400. In this way, the microprocessor 312 may set all internal registers and/or data buffers as may be required for proper operation.

Figure 5:
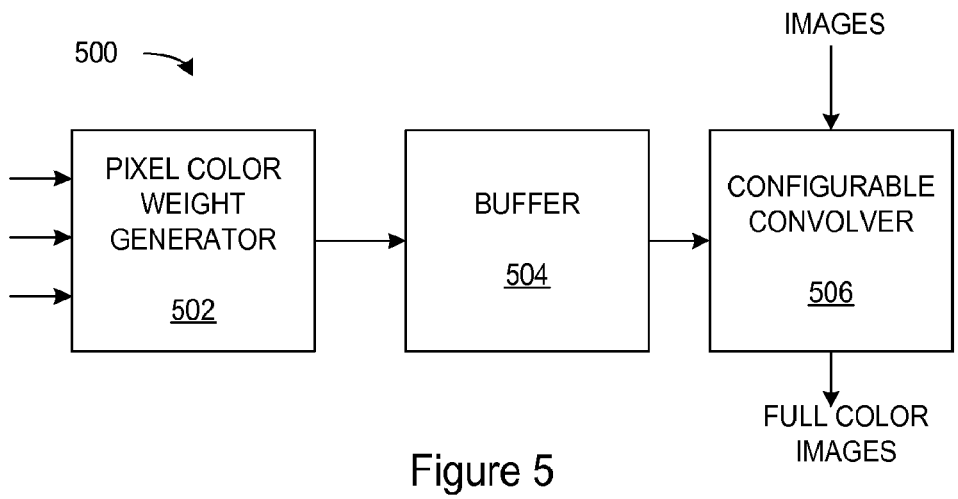
FIG. 5 is a functional block diagram of a color interpolator in accordance with an embodiment of the invention.

FIG. 5 is a functional block diagram of a color interpolation circuit 500 in accordance with an embodiment of the invention. It should be noted that the color interpolation circuit 500 is but one possible embodiment of the color interpolator 422 used in the digital image processor 400 shown in FIG. 4. In the described embodiment, the color interpolation circuit 500 is capable of receiving a variety of color interpolation input data and determining the weights that are to be used in processing raw input pixel signals into re-sampled pixel signals that have full color at each location. The color interpolation input data may include the number of photosites (or pixels) on the active surface of the image sensor array, the associated color filter array (CFA), as well as any desired filtering of the re-sampled resulting image.

The color interpolation circuit 500 includes a pixel color weight generator 502 capable of generating the pixel color weights that, taken together, form pixel color weight matrices used to generate the re-sampled image. The pixel color weight generator 502 receives the color interpolation input data, such as the number of pixels in the image sensor array, the associated CFA of the particular image sensor array, as well as any desired filtering. The pixel color weight generator 502 then uses the received color interpolation input data to form a multiplexed array of pixel color weights. The multiplexed array of pixel color weights are then stored in a pixel color weight matrix buffer 504 which forms an input to a configurable convolver 506. The configurable convolver 506 in turn receives the raw image data and operates to form the re-sampled resulting image having full color at every pixel.

Figure 6:
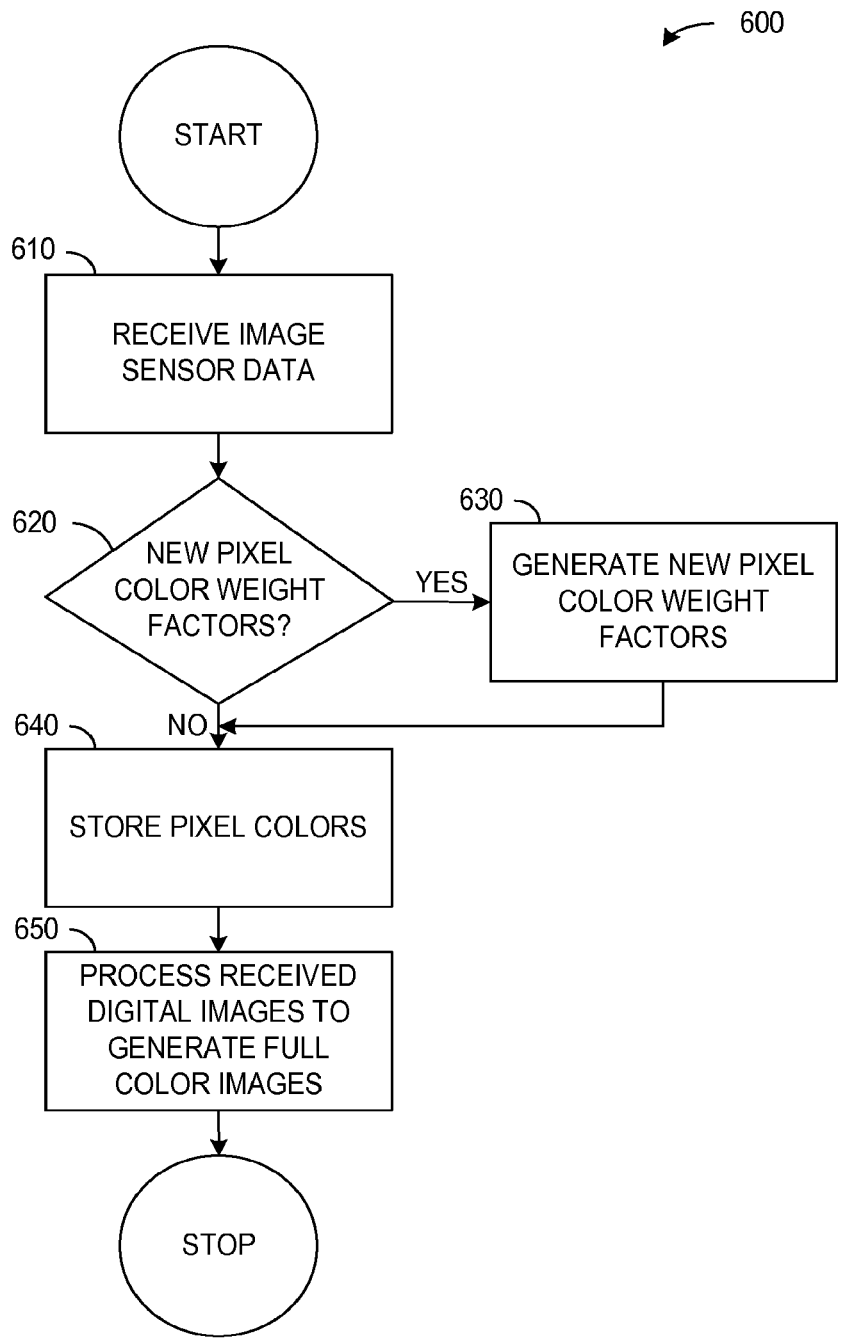
FIG. 6 is a flowchart detailing the color interpolation of a digital image by the color interpolation circuit in accordance with an embodiment of the invention.

FIG. 6 is a flowchart detailing the color interpolation 600 of a digital image by the color interpolation circuit 500 in accordance with an embodiment of the invention. It should be noted that the flowchart illustrates but one possible process implemented in the color interpolation circuit 500 used in the digital image processor 400 shown in FIG. 5. The color interpolation of the digital image begins with the pixel weight generator 502 receiving appropriate image sensor data 610. The image sensor data may include the number of pixels in the image sensor array as well as the particular color filter array associated with the image sensor array. The input data may also include optional digital image filtering selected by the user. Once received, a determination is made if new pixel color weight factors are required 620. If it is determined that new pixel color weight factors are required, they are generated 630, in one embodiment of the invention, by firmware included in the microprocessor 312 using the image sensor input data. These pixel color weight factors may be generated by any number of techniques well known to those skilled in the art. One such technique referred to as bi-linear interpolation uses known pixel colors to derive the unknown pixel colors. Another well-known technique referred to as bi-cubic interpolation may be used when higher color fidelity is required. Once the pixel color weight factors have been derived using any suitable technique, they are stored 640 in a pixel color weight buffer where they remain until needed. A configurable convolver then uses the stored pixel color weight factors to process 650 received digital images and generate full color digital images.

Figure 7:
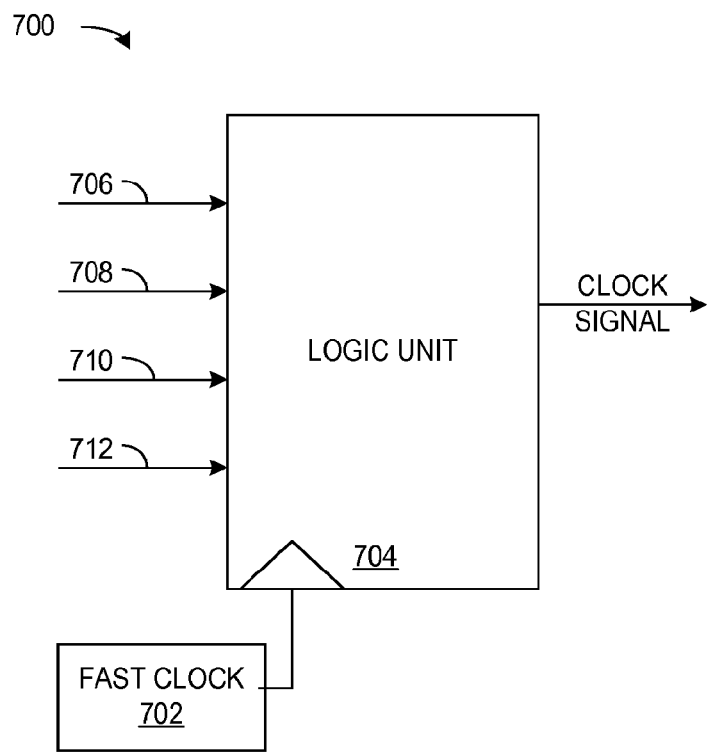
FIG. 7 is a block diagram of a universal state machine controller in accordance with an embodiment of the invention.

FIG. 7 is a block diagram of a universal state machine controller 700 in accordance with an embodiment of the invention. It should be noted that the universal state machine controller 700 is but one possible embodiment of the universal state machine controller 446 used in the digital image processor 400 shown in FIG. 4. The universal state machine controller 700 is capable of providing both symmetric and non-symmetric clock signals as well as pulse signals. By symmetric clock signals it is meant those clock signals having symmetric waveforms whereas non-symmetric clock signals have non-symmetric waveforms. Such clock signals may include those pixel clocks used to synchronize the operation of the CCD array included in the image sensor 306.

The universal state machine controller 700 includes a fast clock 702 capable of generating precise symmetric waveforms. Typically, the fast clock period is approximately 10 ns but may range as low as approximately 1 ns, or as may be required by the particular CCD array for which the clock signals are being generated. In the embodiment shown in FIG. 7, the fast clock 702 forms an input to a logic unit 704 having input lines 706 through 712 capable of carrying input signals derived from data stored in the data registers 447. The logic unit 702 uses such input signals to form the desired symmetric or non-symmetric clock signal.

To form a symmetric clock signal, one implementation of the universal state machine controller 700 provides for the input line 706 to supply an initial state signal indicative of a high going clock signal or a low going clock signal. The input line 50S supplies a period signal indicative of the number of ticks (each tick being equivalent to a single period of the fast clock 702) for which the desired clock signal generated by the universal state machine controller 700 extends. The input line 710 supplies a first change signal indicative of the tick at which the polarity of the clock signal generated by the universal state machine controller 700 changes (the half cycle of the clock signal).

If, however, a non-symmetric clock signal is desired, the universal state machine controller 700 provides for the input line 712 to carry a second change signal indicative of the tick at which the clock signal changes polarity in reference to the first change signal.

It should be noted that the logic unit 704 may take the form of any programmable circuit. The programmable nature of the logic block 704 provides the universal state machine controller 700 with a wide range of operable modes.

Figure 8A:
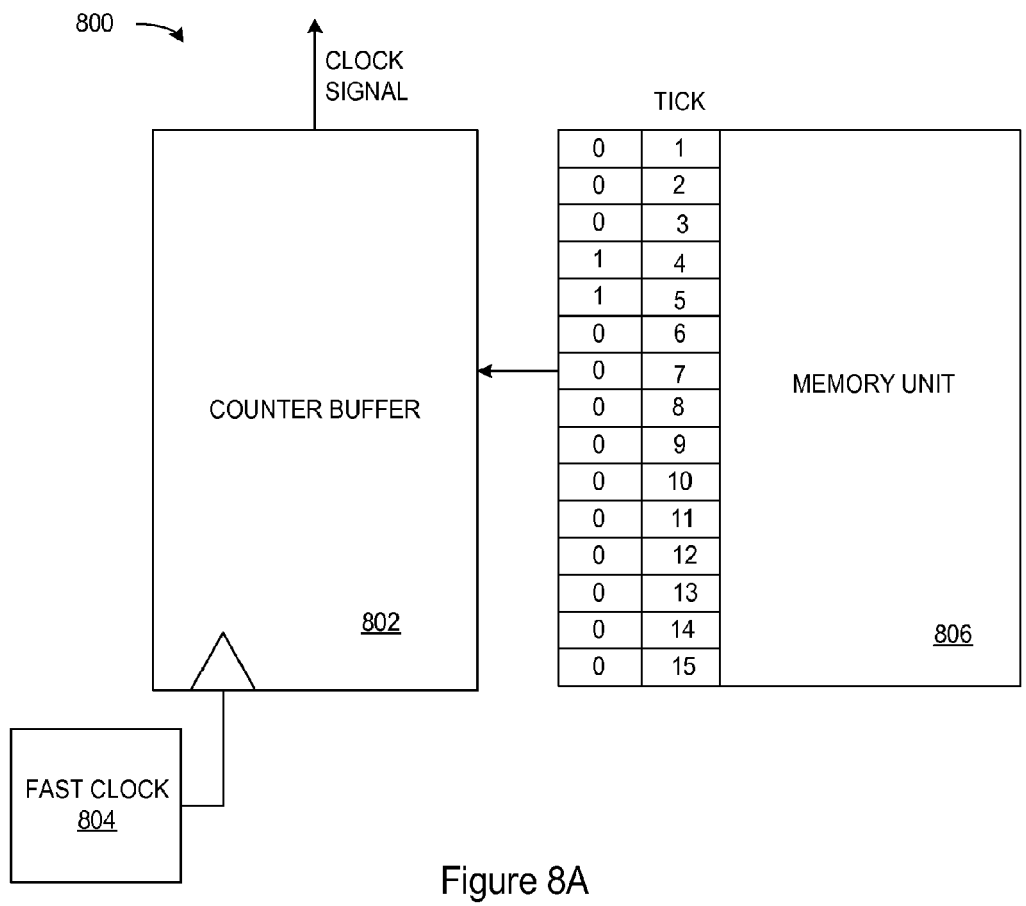
FIG. 8A is a block diagram of a universal state machine controller in accordance with another embodiment of the invention.

FIG. 8A is a block diagram of a universal state machine controller 800 in accordance with another embodiment of the invention. The universal state machine controller SOO includes a counter buffer 802 connected to a fast clock 804 capable of acting as a counter. The counter buffer 802 is also operably connected to a memory unit S06 capable of storing a representation of a desired clock signal waveform.

Figure 8B:
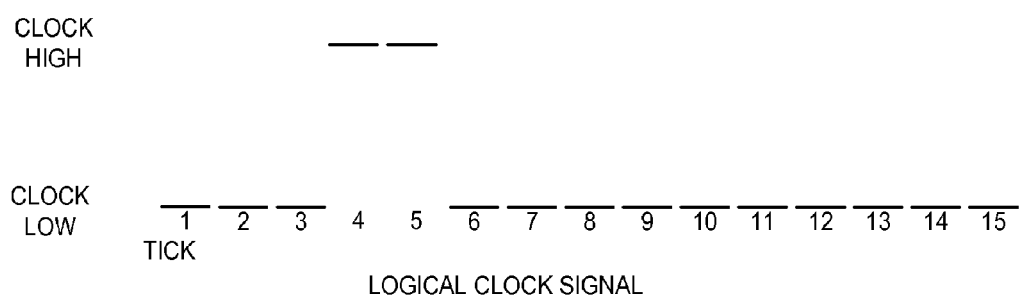
FIG. 8B is a representative non-symmetric clock signal in accordance with an embodiment of the invention.

In operation, a representation of the desired clock signal is stored in the memory unit 806. One such representation shown in Figure SA provides the universal state machine controller 800 with data sufficient to form the non-symmetric clock signal shown in FIG. 8B. The universal state machine controller 800 forms the non-symmetric clock signal by applying the stored representation to the counter buffer 802. The counter buffer 802 in turn acts in conjunction with the fast clock 804 to form the associated non-symmetric clock signal. It should be noted that in this particular example, a logical "1" stored in the memory 806 corresponds to logical CLOCK HIGH while a logical "0" corresponds to a logical CLOCK LOW.

It should also be noted that the counter buffer 802 and the memory 806 can be any form of memory capable of storing data consistent with the operation of the universal state machine controller 800. Such memories can include but are not limited to static random access memories, dynamic random access memories, and any other suitable volatile or non-volatile memory device.

Figure 9:
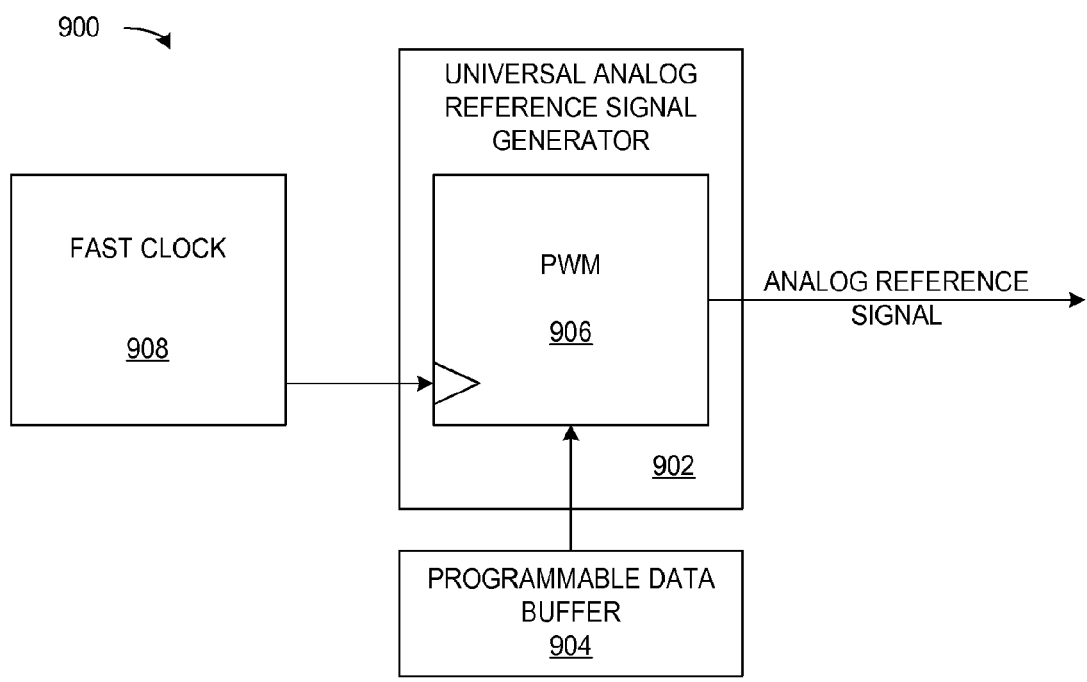
FIG. 9 is a block diagram of a programmable analog reference signal generator in accordance with an embodiment of the invention.

FIG. 9 is a block diagram of a programmable analog reference signal generator 900 in accordance with an embodiment of the invention. It should be noted that the programmable analog reference signal generator 900 is but one possible embodiment of the programmable analog reference signal generator 448 used in the digital image processor 400 shown in FIG. 4. The programmable universal controller 900 includes a universal analog reference signal generator 902 coupled to a programmable data buffer 904 capable of generating analog reference signals. It should be noted that the programmable data buffer 904 is but one possible embodiment of the register set 449 shown in FIG. 4.

In one embodiment of the invention, the universal analog reference signal generator 902 takes the form of a pulse width modulation (PWM) block represented as PWM 906. The PWM 906 uses data stored in the programmable data buffer 904 in conjunction with a fast clock 908 to generate any desired analog reference signal. The analog reference signals generated can be selectively formed to meet the requirements of the particular operating mode of the digital camera 300. In the case where the digital camera 300 is operating in the capture mode, the programmable data buffer 904 can supply data appropriate to that mode of operation. In another case where the digital camera 300 is operating in, for example, the cineview mode, the programmable data buffer 904 can supply appropriate data accordingly.

Figure 10A:
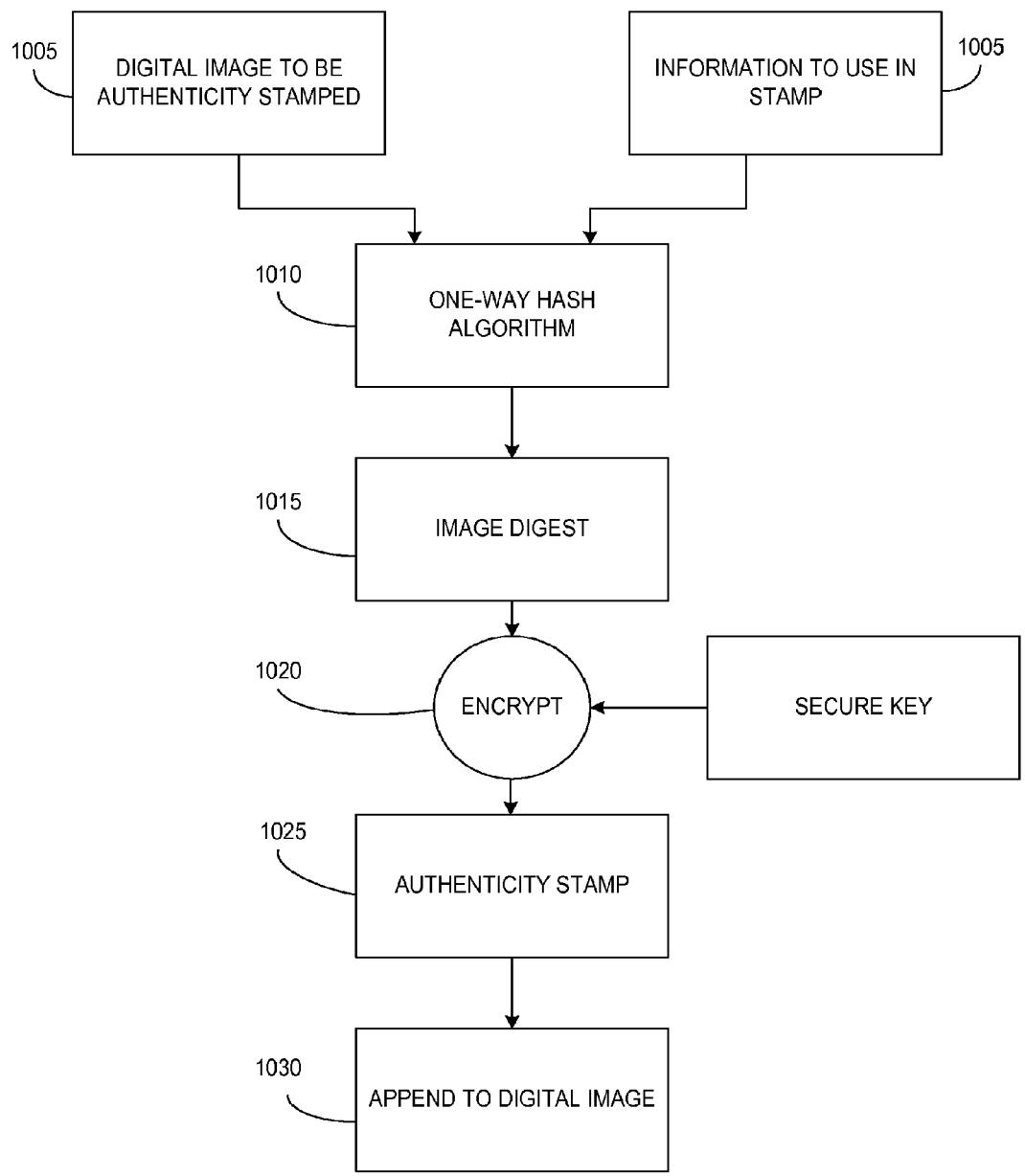
FIG. 10A is a flowchart detailing authentication stamping of a digital image in accordance with an embodiment of the invention.

FIG. 10A is a flowchart detailing authentication stamping of a digital image in accordance with an embodiment of the invention. It should be noted that the flowchart illustrates but one possible process implemented in the authentication stamper 418 used in the digital image processor 400 shown in FIG. 4. Therefore, the authentication stamping shall be described in context of the digital image processor 400 and all references included therein. First, a digital image to be authentication stamped along with associated useful authenticating information (sometimes referred to as private camera information) are obtained 1005. The digital image to be authentication stamped and the authenticating information are then processed 1010 using for example, a one-way HASH algorithm. The resulting image digest 1015 is encrypted 1020 using a secure key to form an digital authentication stamp 1025 which is appended to the digital image 1030.

Figure 10B:
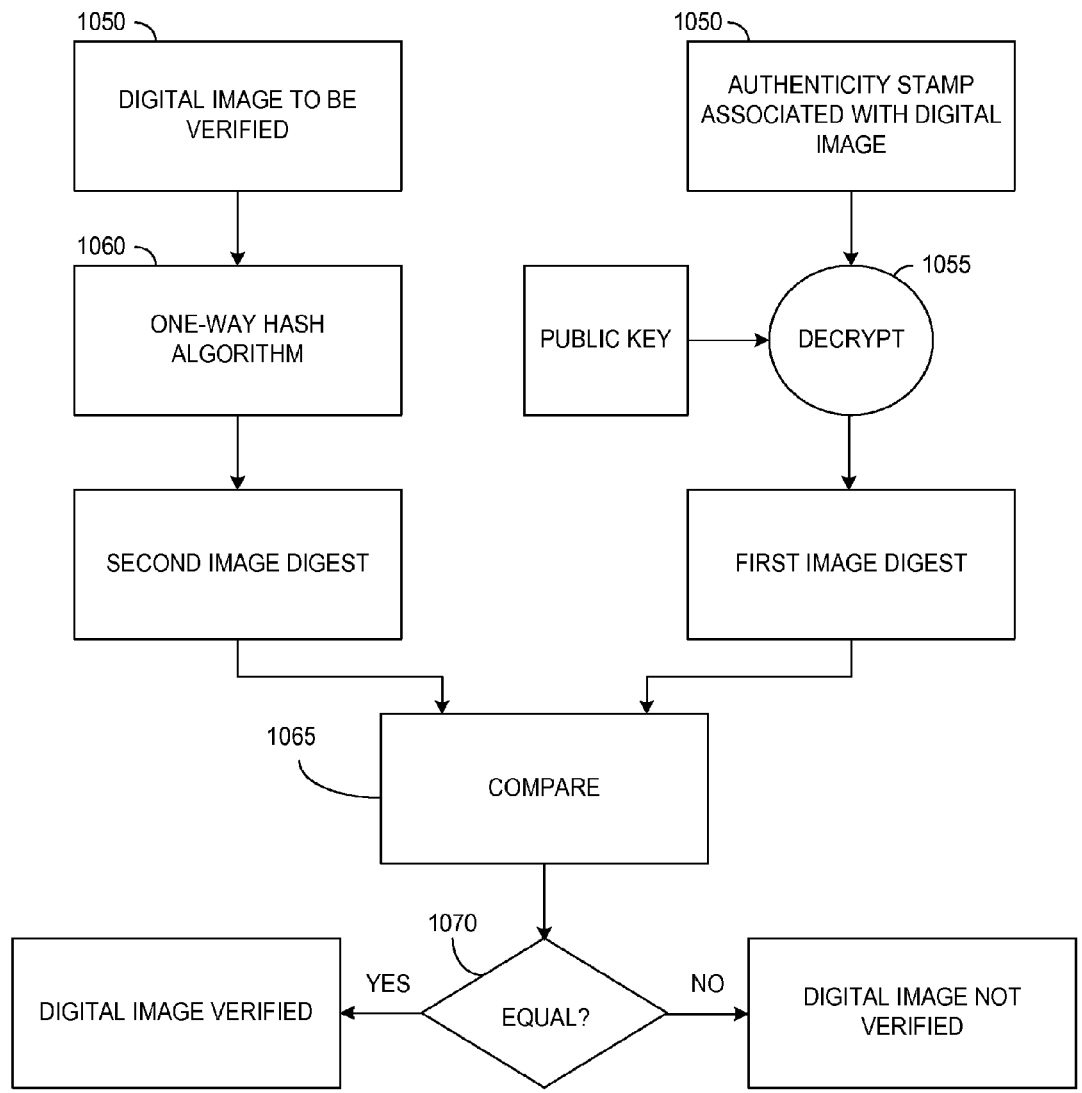
FIG. 10B is a flowchart detailing verification of an authentication-stamped digital image in accordance with an embodiment of the invention.

FIG. 10B is a flowchart detailing verification of an authentication stamped digital image in accordance with an embodiment of the invention. First, a digital image having an associated authenticity stamp is received 1050. Next, decrypting the associated authenticity stamp using a public key 1055 forms a first image digest. A second image digest is also formed by processing the digital image to be verified, using for example a one-way HASH algorithm 1060. Next, the first image digest and the second image digest are compared 1065. Finally, verification of the digital image based upon the comparing of the image digests is performed 1070. In one implementation of the invention, if the image digests are equal, then the digital image is verified. Alternatively, if the image digests are not equal then the digital image is not verified.

The authenticity stamp is useful for many purposes including, for example, authenticating the source camera, image author, and image date of any digital image so stamped. It should be noted that the secure key is associated with only the digital camera system 300 into which the digital image processor 400 is installed. Any other digital camera system into which the digital image processor 400 is installed will have a different secure key. In this way, any digital image produced by a particular digital camera system may be uniquely ascribed to only that particular digital camera system. In other implementations, the authentication stamper 418 may include user specific information such as, for example, user name, user address, camera serial number, manufacturing date and/or code that may be used to further identify the source of the digital image of interest.

Figure 11:
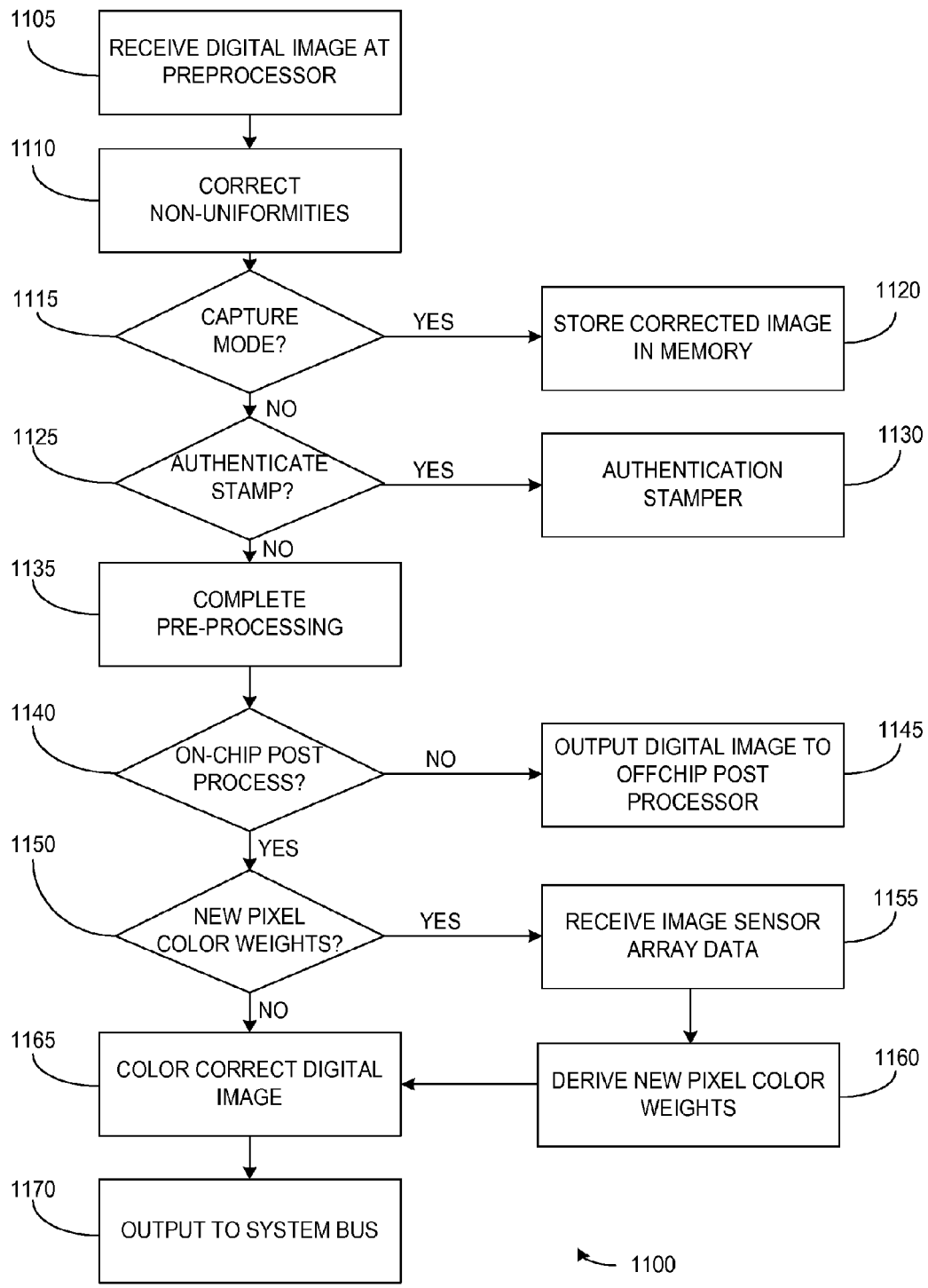
FIG. 11 is a flowchart detailing the image processing of raw digital image data by a digital image processor in a digital camera system in accordance with an embodiment of the invention.
Figure 12:
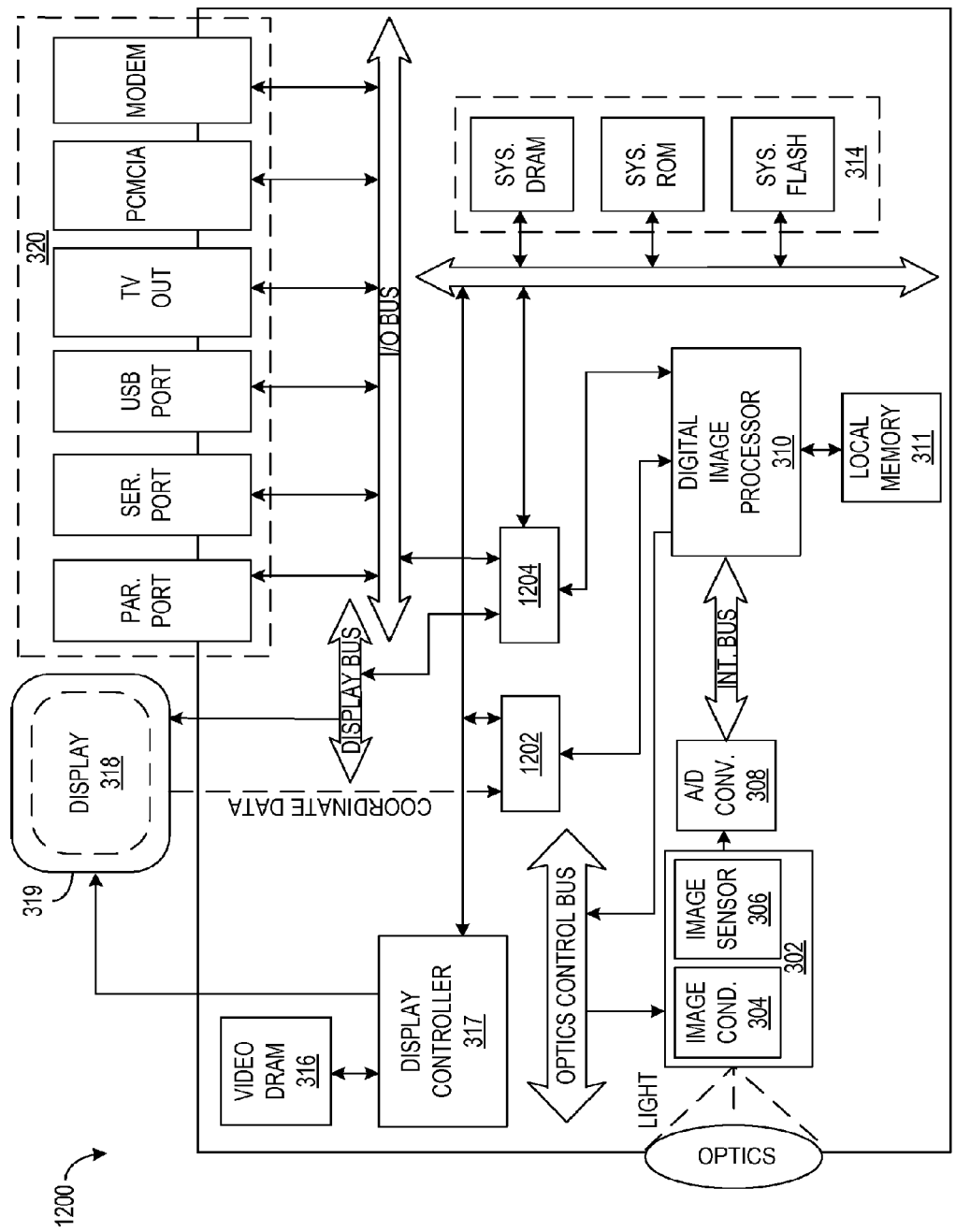
FIG. 12 is a block diagram of a digital camera system in accordance with another embodiment of the invention.

FIG. 11 is a flowchart detailing the image processing 1100 of raw digital image data by a digital image processor 400 in a digital camera system 300 in accordance with an embodiment of the invention. The image processing of raw digital image data begins with an image sensor within the digital camera generating a raw analog digital data that a converter then converts to raw digital image data. A preprocessor receives the raw digital image data 1105. The first processing stage then corrects 1110 any non-uniformities in the digital image. Such non-uniformities correction may be accomplished using PRNU and white balance techniques where PRNU coefficients are stored in memory. Next, if the digital camera is operating in capture mode 1115, the corrected digital image is stored in memory 1120. If, however, the digital camera is not operating in capture mode 1115, then it is determined whether the corrected digital image is to be authentication stamped 1125. If the corrected digital image is to be authentication stamped, then the corrected digital image is forwarded to the authentication stamper 1130. If it is determined that the image is not to be authentication stamped 1125, then the corrected digital image is fully preprocessed by the preprocessor 1135. Next, it is determined if the digital image is to be post processed on-chip 1140. By on-chip it is meant that post processing is performed by the digital image processor. If it is determined that the post processing is performed off-chip, the digital images are sent to an off chip processor 1145. If it is determined that the post processing is to be done on-chip 1140, it is then determined if new pixel color weight factors are required 1150. If it is determined that new pixel color weight factors are required, then appropriate image sensor data is received 1155 and used to derive new pixel weight factors 1160 associated with the image sensor. In either case, the digital image is then color corrected 1165, and the color corrected digital image is output to the system bus FIG. 12 is a block diagram of a digital camera system 1200 in accordance with another embodiment of the invention. The digital camera system 1200 is formed of the digital camera system 300 shown in FIG. 3 wherein the microprocessor 312 has been replaced by specialized processors. Such specialized processors include a video processor 1202 capable of processing viewable images as well as a system processor 1204 capable of directing the operations of the digital camera system 1200. By providing specialized processors, the digital camera system 1200 is well suited for use in more specialized applications where particular processing needs are important. An application requiring high speed video processing unavailable with more general application processors would be well served by the digital camera system 1200.

Figure 13:
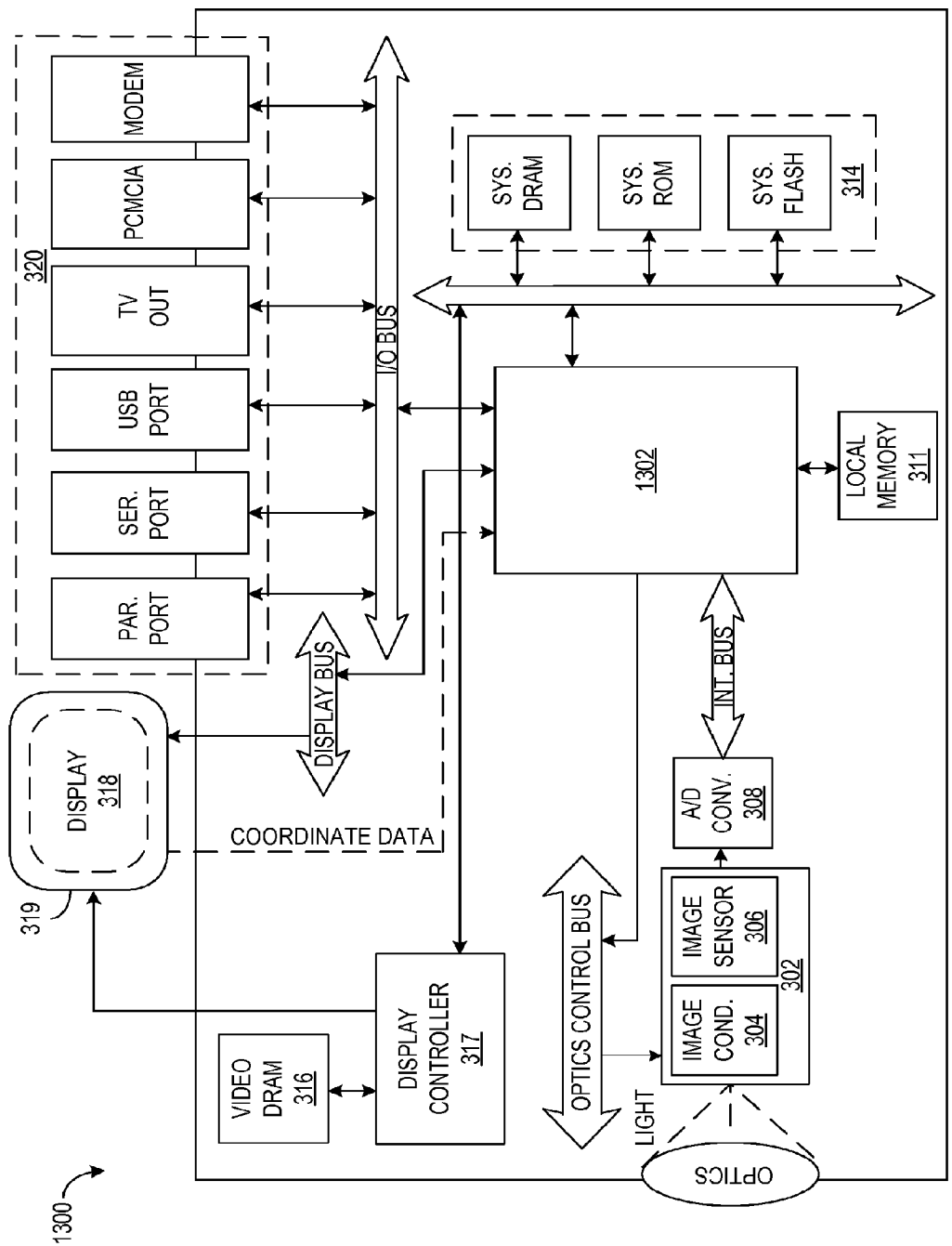
FIG. 13 is a block diagram of a digital camera system in accordance with yet another embodiment of the invention.

FIG. 13 is a block diagram of a digital camera system 1300 in accordance with yet another embodiment of the invention. The digital camera system 1300 is formed of the digital camera system 300 wherein the microprocessor 312 and the digital image processor 310 have been combined into a microprocessor 1302. In this arrangement, the digital camera system 1300 has a higher degree of integration providing for fewer components in the manufacture of the digital camera system 1300.

It should also be noted that the digital image processor is capable of supporting any suitable number imaging arrays included in an associated image sensor.

Figure 14:
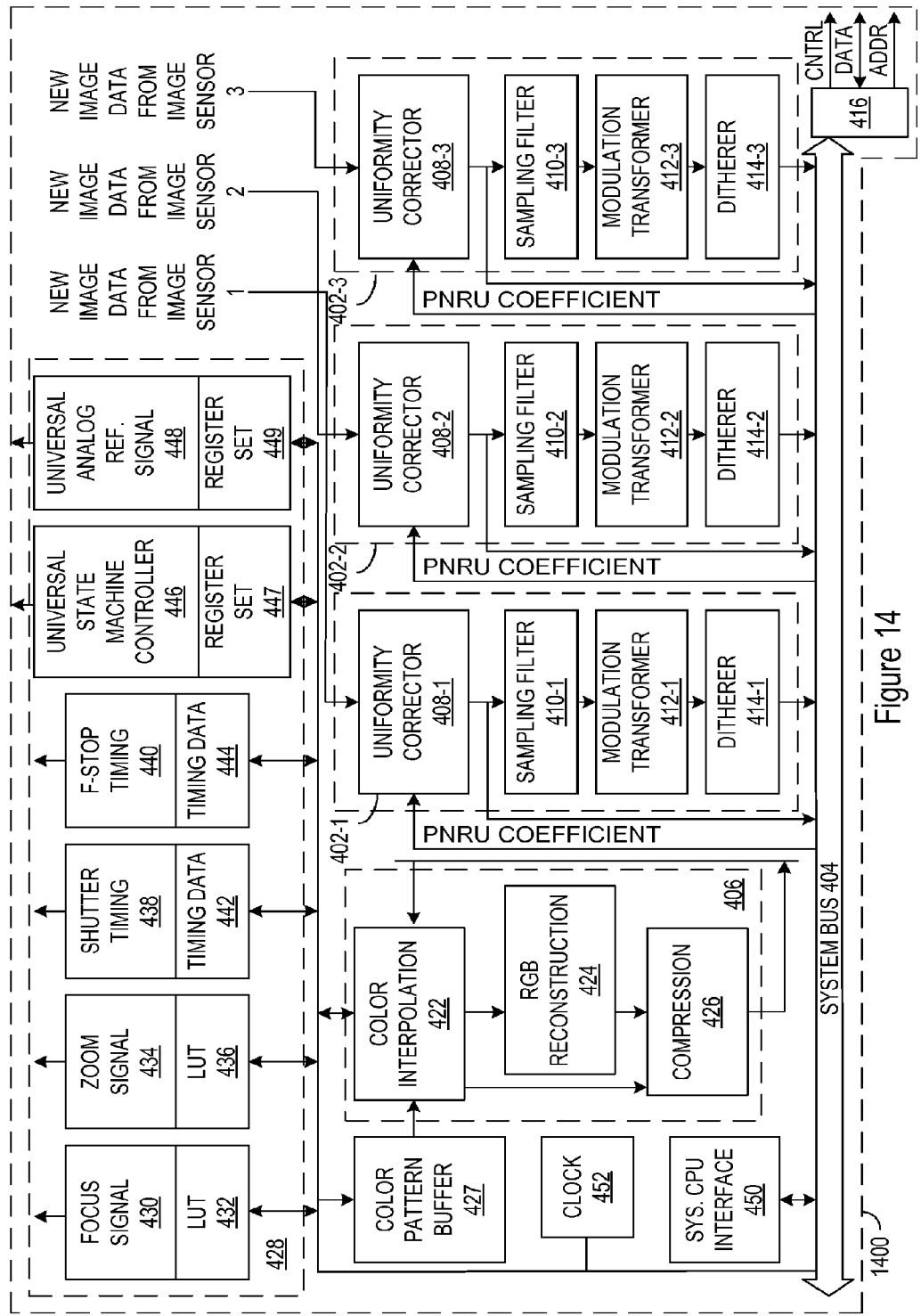
FIG. 14 is a block diagram of a digital camera system in accordance with another embodiment of the invention.

FIG. 14 is a block diagram of a digital image processor 1400 in accordance with an embodiment of the invention. The digital image processor 1400 is capable of processing raw digital images from an image sensor that includes three imaging arrays where each imaging array is arranged to respond to, for example, a single primary color. As shown in FIG. 14, the digital image processor 1400 is a straightforward modification of the digital image processor 400 shown in FIG. 4 and the digital camera 300 shown in FIG. 3. The digital image processor 1400 receives the raw digital images from three image sensors and simultaneously processes the raw digital images. Three separate preprocessors 402-1, 402-2, and 402-3 receive separate raw digital images from associated image sensors and process the respective raw digital images accordingly. The processed images are then combined using, for example, firmware included in the microprocessor 312 before being stored in the local memory 311 and/or the system memory 314. In this way, a camera manufacturer is capable of producing a digital camera capable of producing very precise color photography without resorting to expensive and time consuming fitting procedures. It should be noted that the authentication stamper 418 has been omitted for sake of clarity only, and an authentication stamper may in fact be used to authentication stamp any image the digital image processor 1400 processes.

Figure 15:
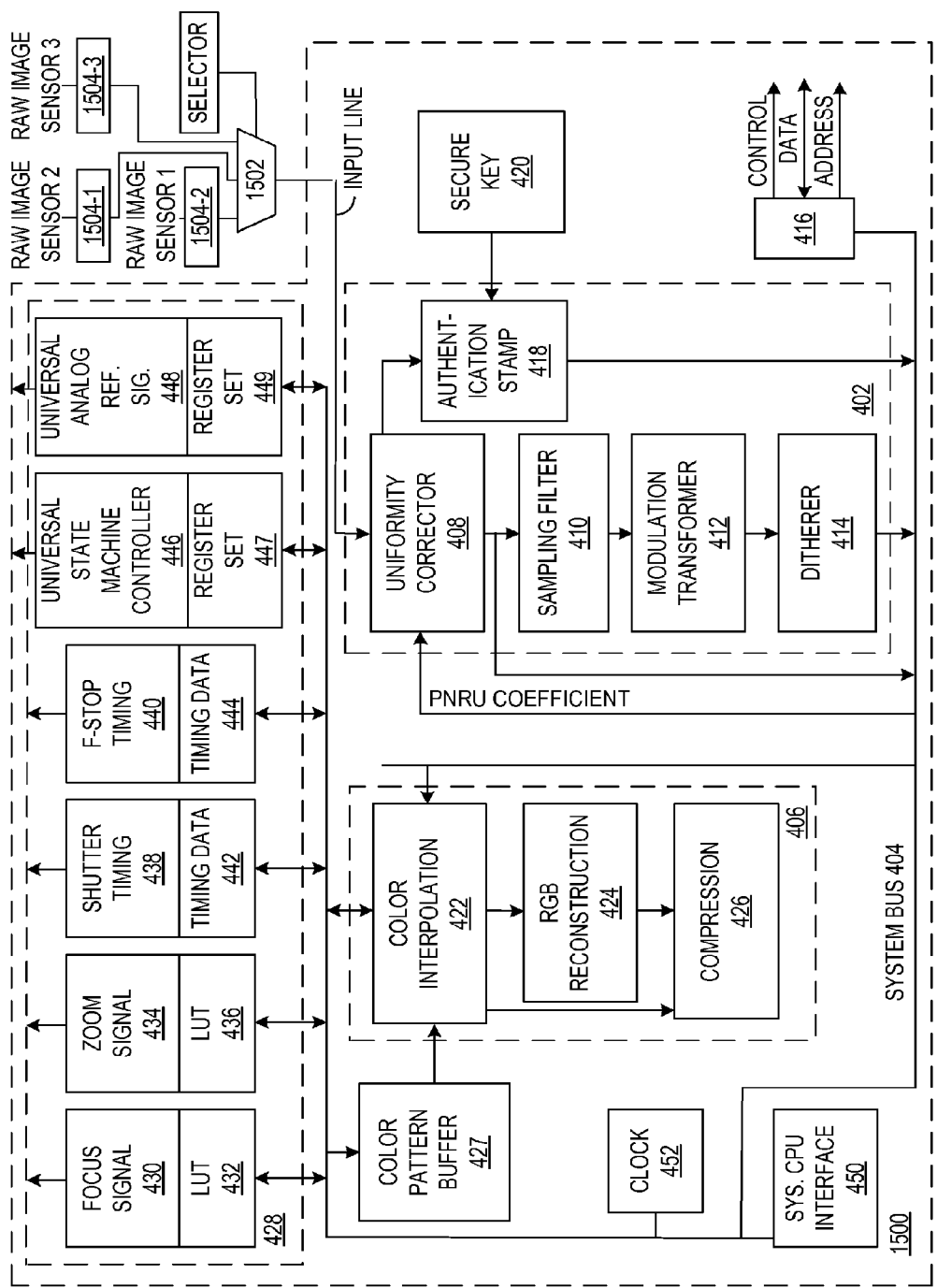
FIG. 15 is a block diagram of a digital camera system in accordance with another embodiment of the invention.

FIG. 15 is a block diagram of a digital image processor 1500 capable of processing digital images from three image sensors in accordance with another embodiment of the invention. The digital image processor 1500 is capable of processing the raw digital images from three image processors using a multiplexer 1502 connected to three data buffers 1504-1 through 1504-3 capable of staging raw digital images from the three image sensors included in the digital camera. The three raw digital images staged in the data buffers 1504-1, 1504-2, and 1504-3 are received at the multiplexer 1502 based upon a selection signal generated by a selector 1506. Once selected, the raw digital image is passed to the preprocessor 402 for suitable processing.

The invention has numerous advantages. One advantage of the invention is that the digital image processor can be used by any digital camera manufacturer, regardless of their specific image sensor, color interpolation scheme, etc., in a digital camera. The digital image processor will also significantly reduce development time and costs, as well as component costs since specific ASICs no longer must be provided.

Another advantage of the invention is that the system bus architecture provides for flexible operation of the digital camera. The system bus architecture also provides the digital camera manufacturer the capability of economically configuring the digital camera as desired. In this way, the camera manufacturer is able to offer a wide variety of digital camera configurations without the need to resort to expensive and time consuming fitting procedures.

Yet another advantage of the invention is that it provides the digital camera user with on demand specialized imaging modes such as the capture mode and the cineview mode. Providing these specialized imaging modes makes the taking of quality photos using the digital camera much easier. In addition, these and other specialized imaging modes make the use of the digital camera more cost and time effective since the user is less likely to waste time and effort on photos that will not be used.

Although the foregoing invention has been described in some detail for purposes of clarity of understanding, it will be apparent that certain changes and modifications may be practiced within the scope of the appended claims. It should be noted that there are many alternative ways of implementing the present invention. For example, the system bus has been described as carrying data signals, control signals, and digital image signals. In alternative embodiments, a separate control or other bus could be provided to carry some of these signals. It is therefore intended that the following appended claims be interpreted as including all such alterations, permutations, and equivalents as fall within the spirit and scope of the present invention.

What is claimed is:

1. A digital camera, the digital camera comprising:
an imaging unit including an image sensor and imaging optics;
a digital image processor connected to receive raw digital images from the imaging unit and to process the raw digital images;
a memory configured to store digital image data that has been pre-processed by the digital image processor;
a microprocessor configured to direct retrieval of the digital image data that is stored in the memory; and
a display for viewing digital images;
wherein the digital image processor comprises a pre-processing portion and a post-processing portion, the pre-processing portion including a uniformity corrector configured to correct non-uniformities in the raw digital images using Photo Response Non-Uniformity (PRNU) correction and including a sampling filter, which receives corrected raw digital images from the uniformity corrector, and is configured to reduce the amount of data in the raw digital images for immediate viewing on the display before post-processing operations including color interpolation, RGB reconstruction, and compression.

2. The digital camera of claim 1, wherein the uniformity corrector is located to receive the raw image data before other functional units in the pre-processor.

3. The digital camera of claim 1, wherein the uniformity corrector is further configured to correct uniformities using white balancing.

4. The digital camera of claim 1, wherein the sampling filter is programmable so that the amount of data reduction may be set by a manufacturer or programmed by the microprocessor.

5. A method of operating a digital camera, the method comprising:
capturing raw image data using an imaging unit that includes an image sensor and imaging optics;
pre-processing the raw image data in a digital image processor connected to receive raw digital images from the imaging unit to correct non-uniformities in the raw image data, wherein the pre-processing comprises Photo Response Non-Uniformity (PRNU) correction and wherein the pre-processing further comprises sampling the corrected raw image data to reduce the amount of data in the raw image data; and
immediately displaying the sampled raw image data on a display of the digital camera without first subjecting the pre-processed raw digital data to post-processing operations including color interpolation, RGB reconstruction, and compression.

6. The method of claim 5 further comprising storing the corrected raw image data in a memory of the digital camera.

7. The method of claim 5 further comprising storing the corrected raw image data in a memory of the digital camera directly after the pre-processing.

8. The method of claim 5 wherein the raw image data is pre-processed to correct non-uniformities before being stored in a memory of the digital camera or displayed on a display device of the digital camera.

9. The method of claim 5 wherein the pre-processing comprises white balancing.

10. The method of claim 5, further comprising programming a sampling filter of the digital image processor to change the amount of data reduction.

11. A digital camera, the digital camera comprising:
an imaging unit including an image sensor and imaging optics;
a digital image processor connected to receive raw digital images from the imaging unit and to process the raw digital images;
a memory configured to store digital image data that has been pre-processed by the digital image processor;
a microprocessor configured to direct retrieval of the digital image data that is stored in the memory; and
a display for viewing digital images;
wherein the digital image processor comprises a pre-processing portion and a post-processing portion, the pre-processing portion including a uniformity corrector configured to correct non-uniformities in the raw digital images using white balancing and including a sampling filter, which receives corrected raw digital images from the uniformity corrector, and is configured to reduce the amount of data in the raw digital images for at least one of immediate display on the display and storage in the memory before post-processing operations including color interpolation, RGB reconstruction, and compression.

12. The digital camera of claim 11, wherein the uniformity corrector is located to receive the raw image data before other functional units in the pre-processor.

13. The digital camera of claim 11, wherein the uniformity corrector is further configured to correct uniformities using Photo Response Non-Uniformity (PRNU) correction.

14. The digital camera of claim 11, wherein the sampling filter is programmable so that the amount of data reduction may be set by a manufacturer or programmed by the microprocessor.

15. A method of operating a digital camera, the method comprising:
capturing raw image data using an imaging unit that includes an image sensor and imaging optics;
pre-processing the raw image data in a digital image processor connected to receive raw digital images from the imaging unit to correct non-uniformities in the raw image data, wherein the pre-processing comprises white balancing and wherein the pre-processing further comprises sampling the corrected raw image data to reduce the amount of data in the raw digital images; and
at least one of immediately displaying the sampled raw digital images on a display of the digital camera and storing the sampled raw digital images in the memory without first subjecting the pre-processed raw digital data to post-processing operations including color interpolation, RGB reconstruction, and compression.

16. The method of claim 15 further comprising storing the corrected raw image data in a memory of the digital camera.

17. The method of claim 15 further comprising storing the corrected raw image data in a memory of the digital camera directly after the pre-processing.

18. The method of claim 15 wherein the raw image data is pre-processed to correct non-uniformities before being stored in a memory of the digital camera or displayed on a display device of the digital camera.

19. The method of claim 15 wherein the pre-processing comprises Photo Response Non-Uniformity (PRNU) correction.

20. The method of claim 15, further comprising programming a sampling filter of the digital image processor to change the amount of data reduction.

* * * * *